(12) United States Patent
Yamada et al.

(10) Patent No.: US 9,264,579 B2
(45) Date of Patent: Feb. 16, 2016

(54) CORRECTION CONTROL DEVICE, IMAGE READING APPARATUS, AND CORRECTION CONTROL METHOD

(71) Applicant: FUJI XEROX CO., LTD., Tokyo (JP)

(72) Inventors: Kenji Yamada, Yokohama (JP); Risa Kojima, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/489,966

(22) Filed: Sep. 18, 2014

(65) Prior Publication Data

US 2015/0281518 A1 Oct. 1, 2015

(30) Foreign Application Priority Data

Mar. 26, 2014 (JP) ................................ 2014-064260
Mar. 27, 2014 (JP) ................................ 2014-065950

(51) Int. Cl.
*H04N 1/04* (2006.01)
*H04N 1/409* (2006.01)
*H04N 1/00* (2006.01)

(52) U.S. Cl.
CPC ......... *H04N 1/4092* (2013.01); *H04N 1/00819* (2013.01); *H04N 1/00822* (2013.01)

(58) Field of Classification Search
CPC ............ H04N 1/4092; H04N 1/00819; H04N 1/00822
USPC .................. 358/534, 447, 474, 498, 497, 532
See application file for complete search history.

(56) References Cited

U.S. PATENT DOCUMENTS

| 5,166,810 A | 11/1992 | Sorimachi et al. | |
| 2004/0085589 A1* | 5/2004 | Kanamori | .................... 358/3.24 |
| 2012/0133998 A1* | 5/2012 | Okada | .................... H04N 1/121 358/498 |
| 2012/0263353 A1* | 10/2012 | Kitajima | ............... G01S 7/4802 382/106 |

FOREIGN PATENT DOCUMENTS

JP A-3-88478 4/1991

\* cited by examiner

*Primary Examiner* — Houshang Safaipour
(74) *Attorney, Agent, or Firm* — Oliff PLC

(57) ABSTRACT

There is provided a correction control device. A correcting unit performs edge enhancement correction on image information of each of documents having been read while the corresponding document and a sensor unit having a light receiving element have been moved relatively to each other. A setting unit sets a filter process to be applied by the correcting unit, according to the distance between the sensor unit and each of the documents.

15 Claims, 24 Drawing Sheets

FIG. 4A

ARRANGEMENT OF FILTER COEFFICIENTS OF REFERENCE WINDOW

| I | H | F | H | I |
|---|---|---|---|---|
| G | E | C | E | G |
| D | B | A | B | D |
| G | E | C | E | G |
| I | H | F | H | I |

↑ 110

IN CASE OF REFERENCE WINDOW, IDENTICAL REFERENCE SYMBOLS REPRESENT THE SAME NUMERICAL VALUE

FIG. 4B

MEANINGS OF VARIABLES

| No. | VARIABLE | MEANING |
|---|---|---|
| 1 | Coef A | COEFFICIENT RELATIVE TO REFERENCE SYMBOL "A" OF WINDOW |
| 2 | Coef B | COEFFICIENT RELATIVE TO REFERENCE SYMBOL "B" OF WINDOW |
| 3 | Coef C | COEFFICIENT RELATIVE TO REFERENCE SYMBOL "C" OF WINDOW |
| 4 | Coef D | COEFFICIENT RELATIVE TO REFERENCE SYMBOL "D" OF WINDOW |
| 5 | Coef E | COEFFICIENT RELATIVE TO REFERENCE SYMBOL "E" OF WINDOW |
| 6 | Coef F | COEFFICIENT RELATIVE TO REFERENCE SYMBOL "F" OF WINDOW |
| 7 | Coef G | COEFFICIENT RELATIVE TO REFERENCE SYMBOL "G" OF WINDOW |
| 8 | Coef H | COEFFICIENT RELATIVE TO REFERENCE SYMBOL "H" OF WINDOW |
| 9 | Coef I | COEFFICIENT RELATIVE TO REFERENCE SYMBOL "I" OF WINDOW |
| 10 | FillVal | REFERENCE VALUE FOR CASE WHERE PHOTOELECTRIC CONVERSION ELEMENTS ARE POSITIONED OUTSIDE IMAGE READING AREA |

EXAMPLE OF ARITHMETIC OPERATION

OUTPUT OF TARGET PIXEL P22
= P00 × Coef I + P01 × Coef H + P02 × Coef F + P03 × Coef H + P04 × Coef I
+ P10 × Coef G + P11 × Coef E + P12 × Coef C + P13 × Coef E + P14 × Coef G
+ P20 × Coef D + P21 × Coef B + P22 × Coef A + P23 × Coef B + P24 × Coef D
+ P30 × Coef G + P31 × Coef E + P32 × Coef C + P33 × Coef E + P34 × Coef G
+ P40 × Coef I + P41 × Coef H + P42 × Coef F + P43 × Coef H + P44 × Coef I

* (IN THE ABOVE EXAMPLE, UNDERLINED PARTS BECOME "FillVal")

STATE OF CHANGE IN CTF IN CASE WHERE HEIGHT AT WHICH
CIS UNIT IS IN FOCUS IS 0 mm, AND HEIGHT INCREASES FROM 0 mm
IF CIS UNIT IS RAISED TO CERTAIN HEIGHT, PATTERN BECOMES
COMPLETELY DIM AND THUS IT BECOMES IMPOSSIBLE TO
DISTINGUISH PAIRS OF BLACK LINES AND WHITE LINES

STATE OF CHANGE IN DENSITY LEVEL IN CASE
WHERE HEIGHT AT WHICH CIS UNIT IS IN FOCUS IS 0 mm,
AND HEIGHT INCREASES FROM 0 mm
AS CIS UNIT IS RAISED, IMAGE DARKENS

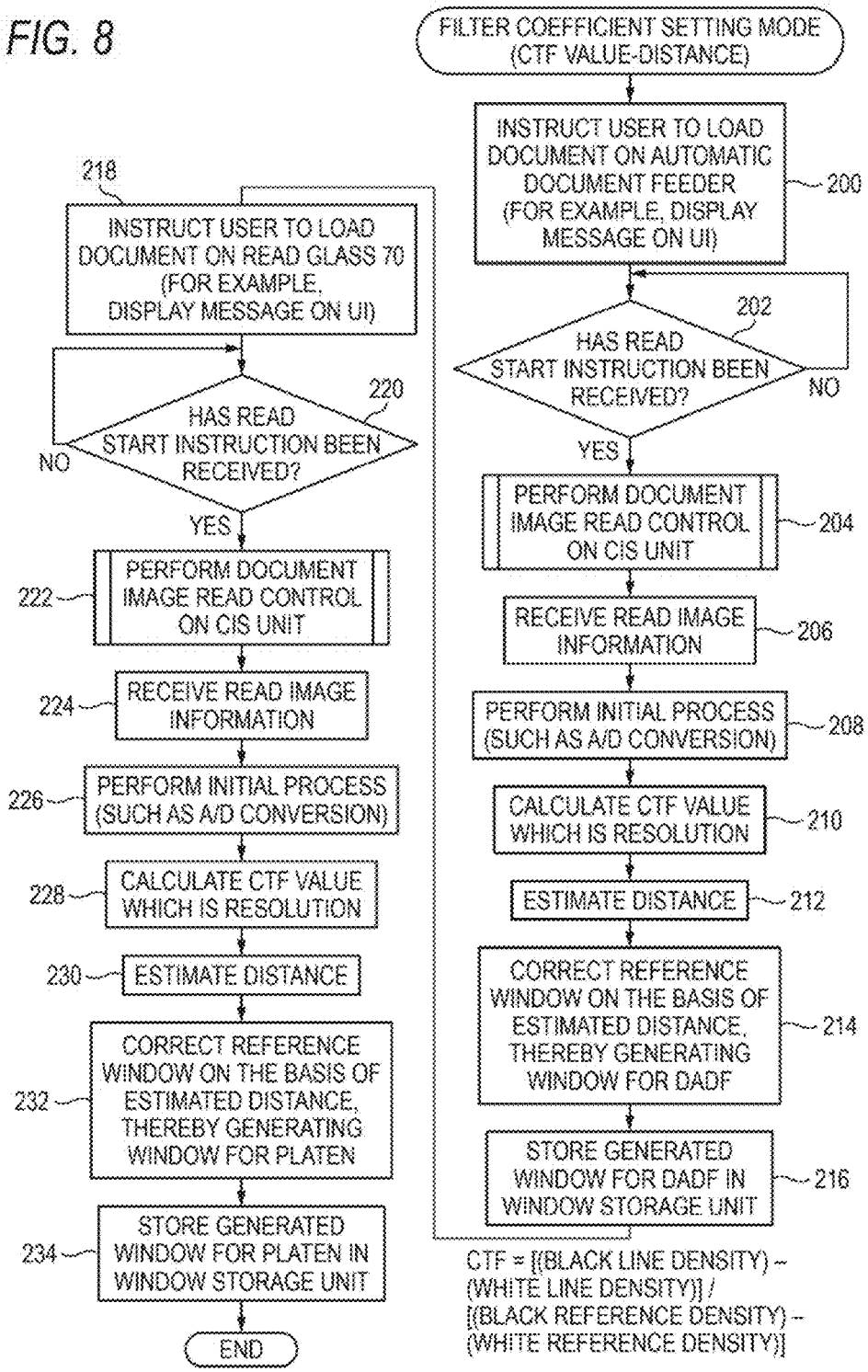

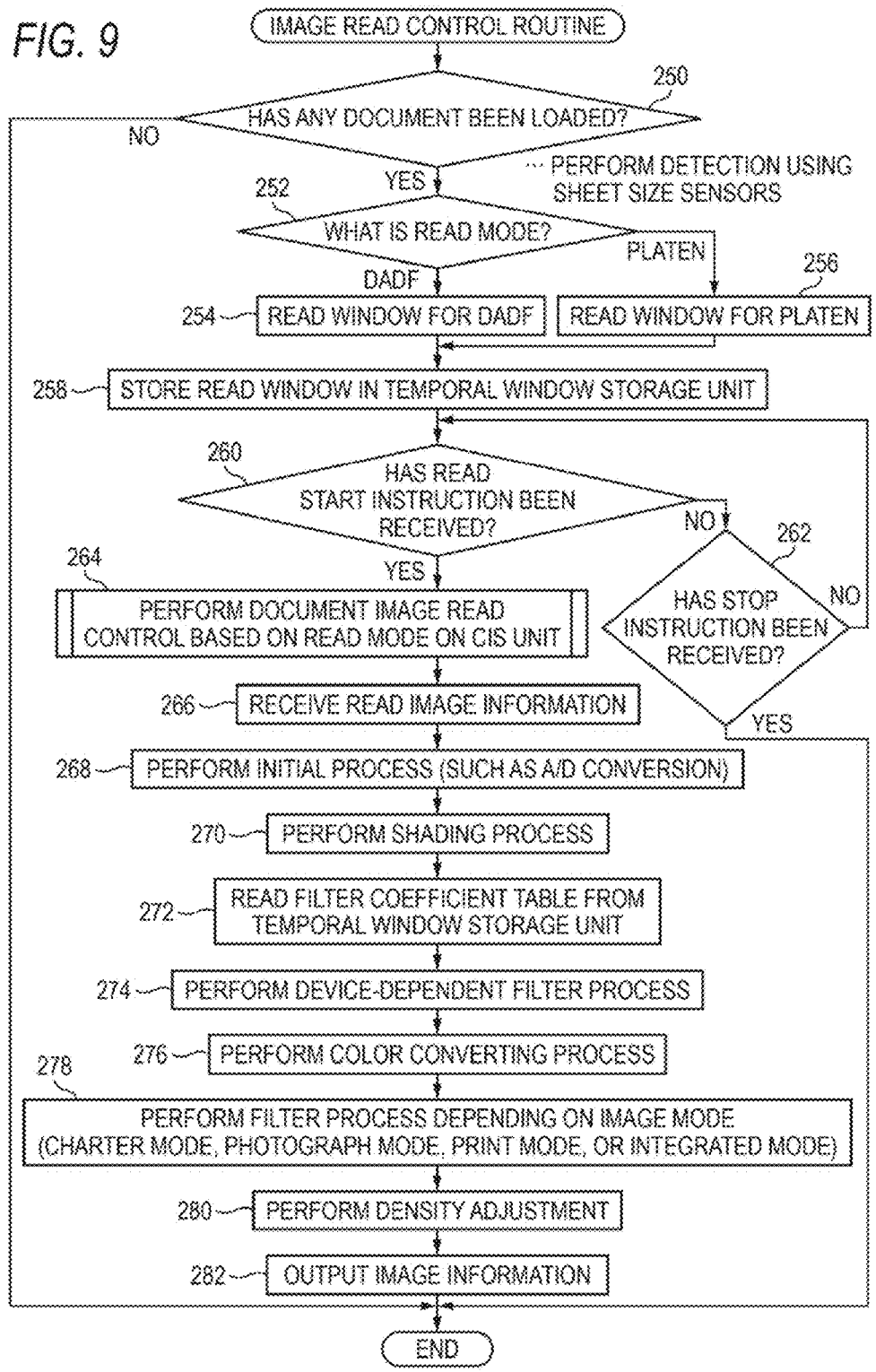

FIG. 10

ARRANGEMENT EXAMPLES OF FILTER COEFFICIENTS (A) REFERENCE WINDOW (IDENTICAL REFERENCE SYMBOLS REPRESENT THE SAME NUMERICAL VALUE)

| I | H | F | H | I |
|---|---|---|---|---|
| G | E | C | E | G |
| D | B | A | B | D |
| G | E | C | E | G |
| I | H | F | H | I |

110

⇩ WINDOW FOR DADF AND WINDOW FOR PLATEN ARE INDEPENDENTLY GENERATED 110P (WINDOW FOR PLATEN)

(B)

110D (WINDOW FOR DADF)

| 0.02375 | -0.0285 | -0.04 | -0.0285 | 0.02375 |
|---|---|---|---|---|
| -0.095 | 0.115 | 0.16 | 0.115 | -0.095 |
| -0.04 | 0.16 | 0.56 | 0.16 | -0.04 |
| -0.095 | 0.115 | 0.16 | 0.115 | -0.095 |
| 0.02375 | -0.0285 | -0.04 | -0.0285 | 0.02375 |

⇩ ENHANCEMENT PROCESS IN MAIN SCAN DIRECTION AND ENHANCEMENT PROCESS IN SUB SAN DIRECTION ARE INDEPENDENTLY PERFORMED 110P (WINDOW FOR PLATEN)

(C)

110D (WINDOW FOR DADF)

| 0.02375 | -0.0285 | -0.04 | -0.0285 | 0.02375 |
|---|---|---|---|---|
| -0.095 | 0.115 | 0.16 | 0.115 | -0.095 |
| -0.3325 | 0.4025 | 0.56 | 0.4025 | -0.3325 |
| -0.095 | 0.115 | 0.16 | 0.115 | -0.095 |
| 0.02375 | -0.0285 | -0.04 | -0.0285 | 0.02375 |

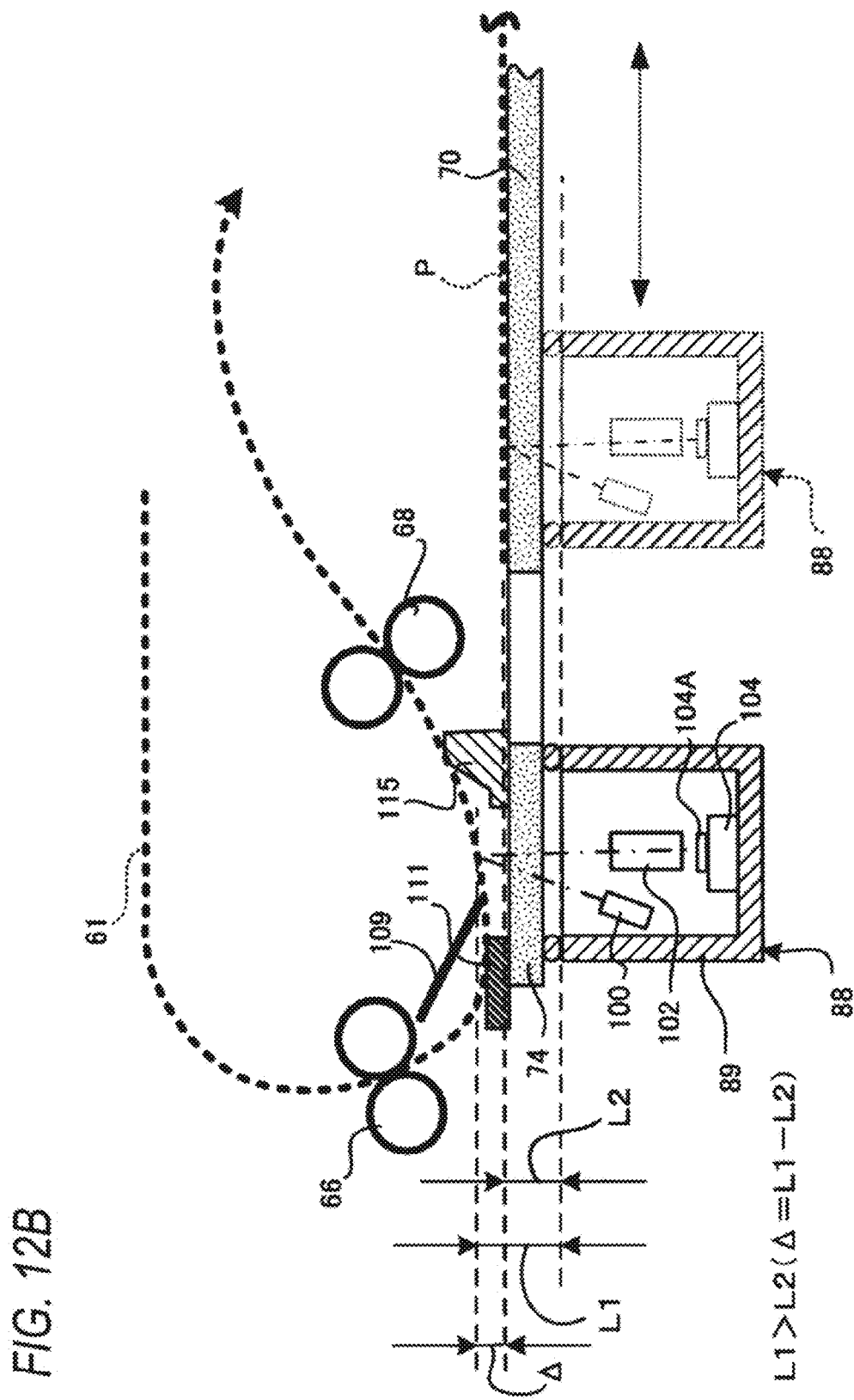

FIG. 14A

ARRANGEMENT OF FILTER COEFFICIENTS OF REFERENCE WINDOW

| I | H | F | H | I |
|---|---|---|---|---|
| G | E | C | E | G |
| D | B | A | B | D |
| G | E | C | E | G |
| I | H | F | H | I |

110

* IN CASE OF REFERENCE WINDOW, IDENTICAL REFERENCE SYMBOLS REPRESENT THE SAME NUMERICAL VALUE

FIG. 14B

MEANINGS OF VARIABLES

| No. | VARIABLE | MEANING |
|---|---|---|
| 1 | CoefA | COEFFICIENT RELATIVE TO REFERENCE SYMBOL "A" OF WINDOW |
| 2 | CoefB | COEFFICIENT RELATIVE TO REFERENCE SYMBOL "B" OF WINDOW |
| 3 | CoefC | COEFFICIENT RELATIVE TO REFERENCE SYMBOL "C" OF WINDOW |
| 4 | CoefD | COEFFICIENT RELATIVE TO REFERENCE SYMBOL "D" OF WINDOW |
| 5 | CoefE | COEFFICIENT RELATIVE TO REFERENCE SYMBOL "E" OF WINDOW |
| 6 | CoefF | COEFFICIENT RELATIVE TO REFERENCE SYMBOL "F" OF WINDOW |
| 7 | CoefG | COEFFICIENT RELATIVE TO REFERENCE SYMBOL "G" OF WINDOW |
| 8 | CoefH | COEFFICIENT RELATIVE TO REFERENCE SYMBOL "H" OF WINDOW |
| 9 | CoefI | COEFFICIENT RELATIVE TO REFERENCE SYMBOL "I" OF WINDOW |
| 10 | FillVal | REFERENCE VALUE FOR CASE WHERE PHOTOELECTRIC CONVERSION ELEMENTS ARE POSITIONED OUTSIDE IMAGE READING AREA |

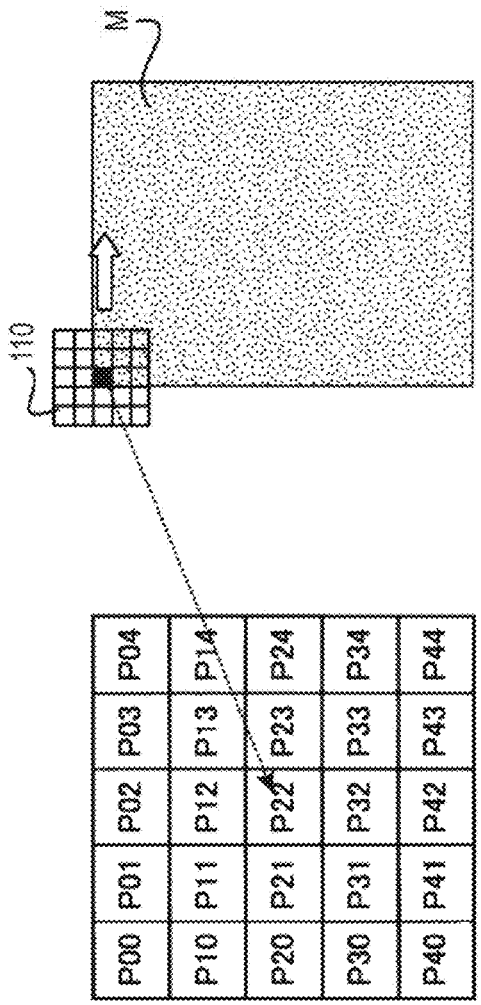

| EXAMPLE OF ARITHMETIC OPERATION |
|---|
| OUTPUT OF TARGET PIXEL P22<br>= P00 × Coef I  + P01 × Coef H + P02 × Coef F + P03 × Coef H + P04 × Coef I<br>+ P10 × Coef G + P11 × Coef E + P12 × Coef C + P13 × Coef E + P14 × Coef G<br>+ P20 × Coef D + P21 × Coef B + P22 × Coef A + P23 × Coef B + P24 × Coef D<br>+ P30 × Coef G + P31 × Coef E + P32 × Coef C + P33 × Coef E + P34 × Coef G<br>+ P40 × Coef I  + P41 × Coef H + P42 × Coef F  + P43 × Coef H + P44 × Coef I<br>* (IN THE ABOVE EXAMPLE, UNDERLINED PARTS BECOME "FillVal") |

FIG. 17
| | BEFORE FILTER PROCESS IN WHICH MAIN SCANNING AND SUB SCANNING ARE INDEPENDENT | AFTER FILTER PROCESS IN WHICH MAIN SCANNING AND SUB SCANNING ARE INDEPEDENT |
|---|---|---|
| STRAIGHT LINE IMAGE Lsm | BLURRING AND SMEAR EXIST 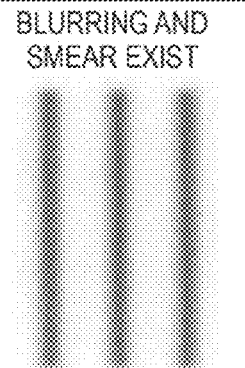 | BLURRING AND SMEAR DOES NOT EXIST 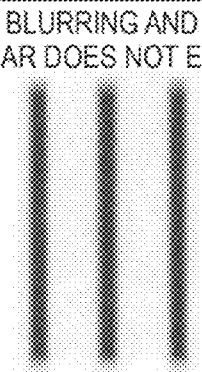 |
| STRAIGHT LINE IMAGE Lss | BLURRING AND SMEAR DOES NOT EXIST 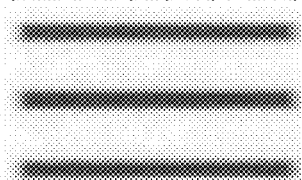 | BLURRING AND SMEAR DOES NOT EXIST 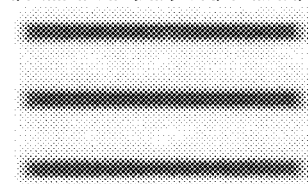 |

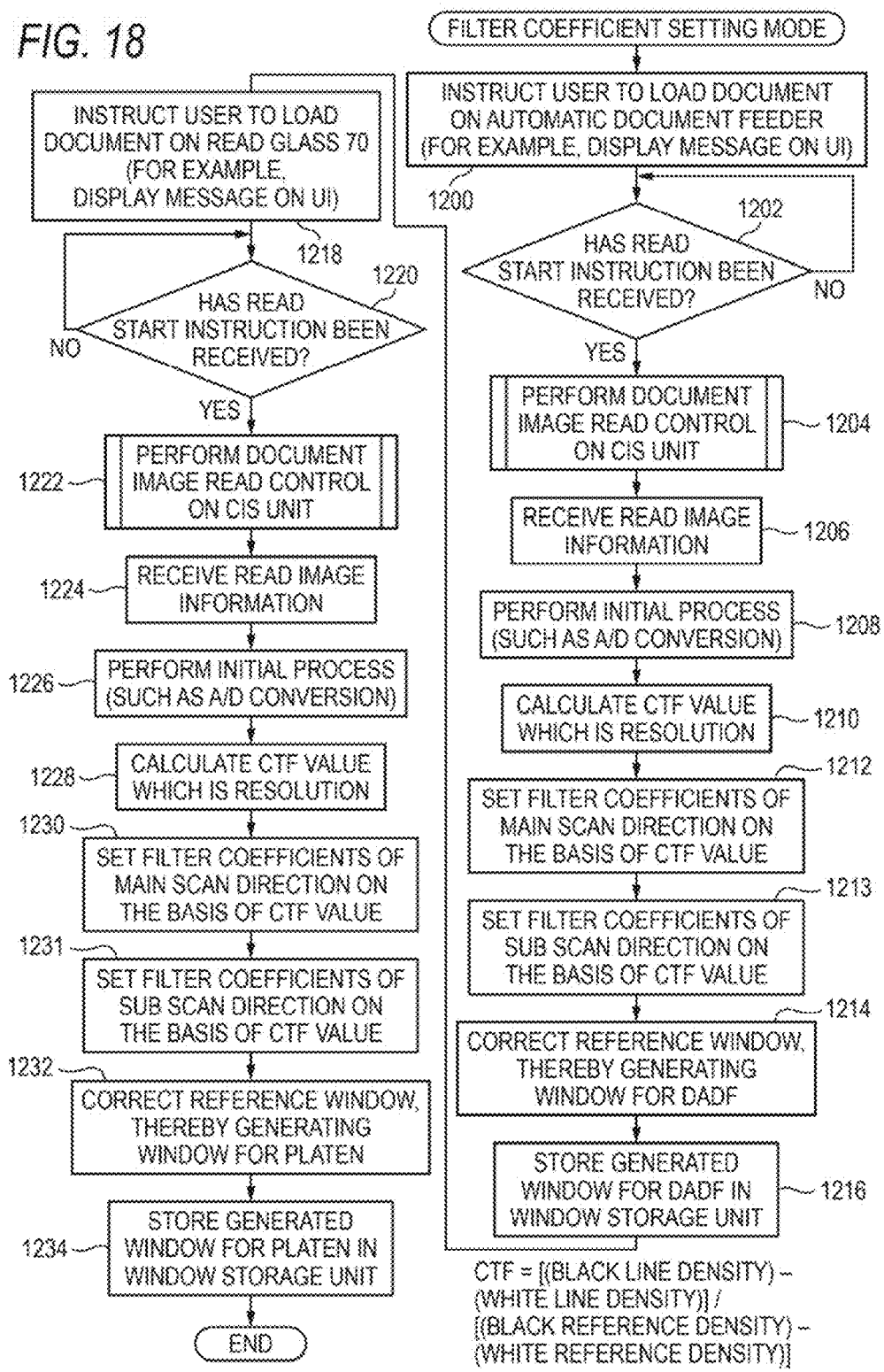

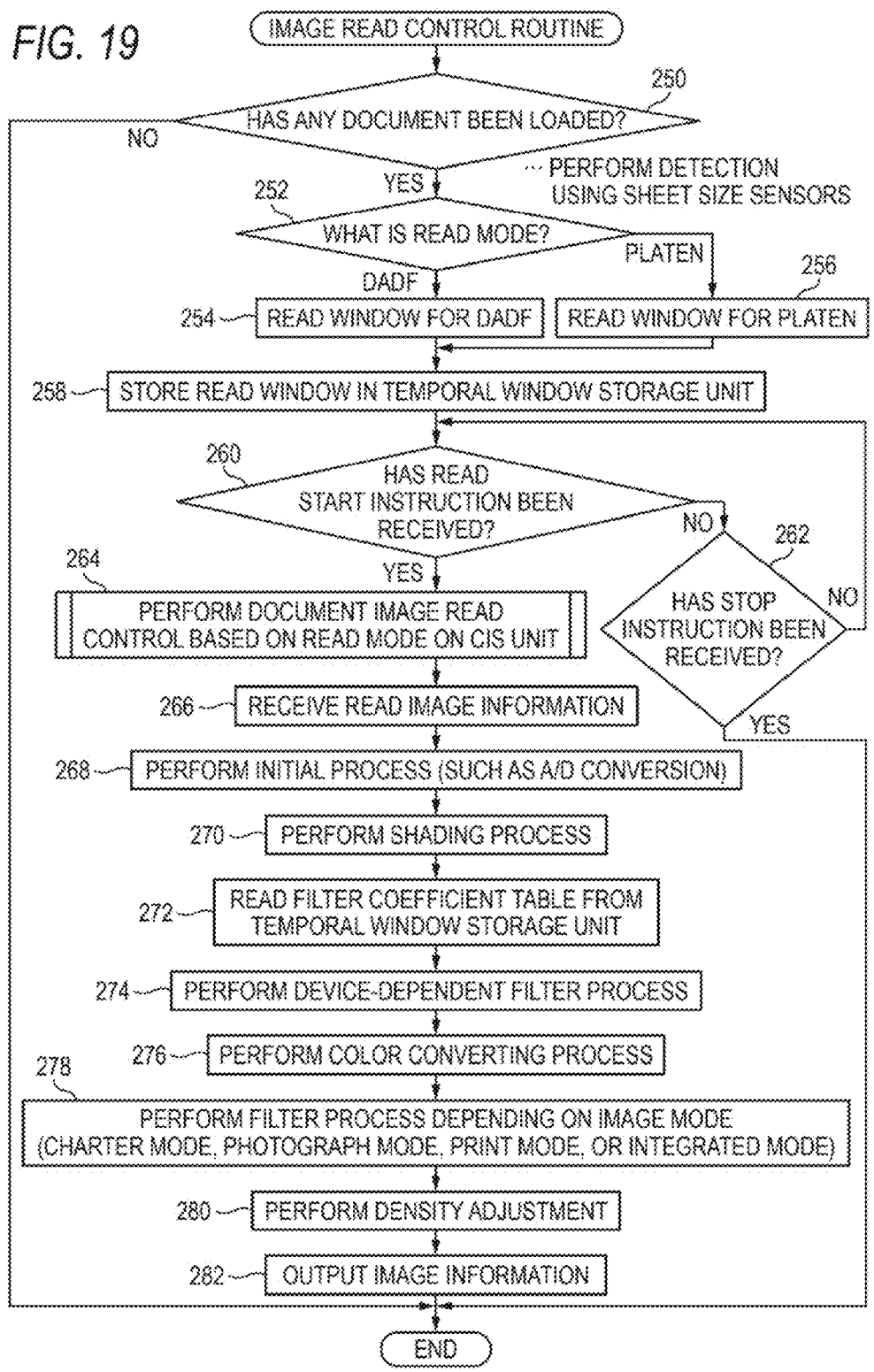

FIG. 20 ARRANGEMENT EXAMPLES OF FILTER COEFFICIENTS (A) REFERENCE WINDOW (IDENTICAL REFERENCE SYMBOLS REPRESENT THE SAME NUMERICAL VALUE)

| I | H | F | H | I |
|---|---|---|---|---|
| G | E | C | E | G |
| D | B | A | B | D |
| G | E | C | E | G |
| I | H | F | H | I |

110

⇩ ENHANCEMENT PROCESS IN WHICH MAIN SCANNING AND SUB SCANNING ARE INDEPENT (WINDOW FOR DADF AND WINDOW FOR PLATEN ARE INDEPENDENTLY GENERATED)

(B) WINDOW (BAND-PASS FILTER) WHICH IS FOR ENHANCING SPECIFIC FREQUENCY AND SUPPRESSES ROUGHNESS OF IMAGE AND ENHANCES CHARACTERS AND THIN LINES 110P (WINDOW FOR PLATEN)
110D (WINDOW FOR DADF)

| 0.02375 | -0.0285 | -0.04 | -0.0285 | 0.02375 |
|---|---|---|---|---|
| -0.095 | 0.115 | 0.16 | 0.115 | -0.095 |
| -0.3325 | 0.4025 | 0.56 | 0.4025 | -0.3325 |
| -0.095 | 0.115 | 0.16 | 0.115 | -0.095 |
| 0.02375 | -0.0285 | -0.04 | -0.0285 | 0.02375 |

∗ DISTANCE-DEPENDENT EDGE ENHANCEMENT OF DADF READING AND PLATEN READING HAS BEEN REFLECTED (C) COMPARATIVE EXAMPLES

GENERAL SHARPENING WINDOW (HIGH-PASS FILTER) WHICH ENHANCES CHARACTERS AND THIN LINES BUT CAUSES ROUGHNESS OF IMAGE

| -1 | -0.5 | -0.2 | -0.5 | -1 |
|---|---|---|---|---|
| -0.5 | 0.5 | 1.2 | 0.5 | -0.5 |
| -0.2 | 1.2 | 3 | 1.2 | -0.2 |
| -0.5 | .05 | 1.2 | 0.5 | -0.5 |
| -1 | -0.5 | -0.2 | -0.5 | -1 |

GENERAL SMOOTHING WINDOW (LOW-PASS FILTER) WHICH CAUSES IMAGE TO GET BLURRED

| 0.01 | 0.02 | 0.04 | 0.02 | 0.01 |
|---|---|---|---|---|
| 0.02 | 0.06 | 0.08 | 0.06 | 0.02 |
| 0.04 | 0.08 | 0.08 | 0.08 | 0.04 |
| 0.02 | 0.06 | 0.08 | 0.06 | 0.02 |
| 0.01 | 0.02 | 0.04 | 0.02 | 0.01 |

∗ NUMERICAL VALUES ARE CORRECTION MAGNIFICATIONS OF DETECTION DENSITY

CORRECTION CONTROL DEVICE, IMAGE READING APPARATUS, AND CORRECTION CONTROL METHOD

CROSS-REFERENCE TO RELATED APPLICATIONS

This application is based on and claims priority under 35 U.S.C. §119 from Japanese Patent Application No. 2014-064260 filed on Mar. 26, 2014 and Japanese Patent Application No. 2014-065950 filed on Mar. 27, 2014.

TECHNICAL FIELD

The present invention relates to a correction control device, an image reading, apparatus, and a correction control method.

SUMMARY

According to a first aspect of the exemplary embodiments of the present invention, there is provided a correction control device comprising: a correcting unit that performs edge enhancement correction on image information of each of documents having been read while the corresponding document and a sensor unit having a light receiving element have been moved relatively to each other; and a setting unit that sets a filter process to be applied by the correcting unit, according to the distance between the sensor unit and each of the documents.

According to a second aspect of the exemplary embodiments of the present invention, there is provided a correction control device comprising: a correcting unit that performs edge enhancement correction on image information of each of documents having been read while the corresponding document and a sensor unit having a light receiving element have been moved relatively to each other; and a setting unit that sets different filter processes to be applied by the correcting unit, in a case where the distances between the sensor unit and the documents are different.

According to a third aspect of the exemplary embodiments of the present invention, there is provided an image reading apparatus comprising: a reading unit that includes a sensor unit having light receiving elements, and reads an image recorded on each of documents while moving the sensor unit and the corresponding document relatively to each other; a correcting unit that performs edge enhancement correction on information of the image read by the reading unit; and a setting unit that sets a filter process to be applied by the correcting unit, for each of a plurality of read positions, according to distance differences between the sensor unit and the documents.

According to a fourth aspect of the exemplary embodiments of the present invention, there is provided an image reading apparatus comprising: a sensor unit that includes a plurality of light receiving elements arranged in one direction; a first reading unit that positions the sensor unit at a first position, and reads an image recorded on each of documents while moving the corresponding document in a direction intersecting with the one direction; a second reading unit that positions each of documents, and reads an image while moving the sensor unit in a direction intersecting with the one direction; a correcting unit that performs edge enhancement correction on image information read by the first reading unit and the second reading unit; and a setting unit that sets different filter processes to be applied on the image read by the first reading unit and the image read by the second reading unit by the correcting unit, on the basis of the difference between the distance from the sensor unit to the image read position of the first reading unit and the distance from the sensor unit to the image read position of the second reading unit.

According to a fifth aspect of the exemplary embodiments of the present invention, there is provided an image reading apparatus comprising: a contact type sensor that reads images by a first reading unit for reading an image of a still document and a second reading unit for reading a moving document; a correcting unit that performs enhancement correction on image information read by the contact type sensor; and a setting unit that sets different degrees of enhancement in the correcting unit, in reading of the first reading unit and reading of the second reading unit.

According to a sixth aspect of the exemplary embodiments of the present invention, there is provided a correction control method, comprising: in a case of performing edge enhancement correction on information of an image having been recorded on each of documents and having been read while relatively moving the corresponding document and a sensor unit having light receiving elements, on the basis of a predetermined filter process, setting a filter process to be applied in the edge enhancement correction, independently for each of the plurality of image read positions, according to the distance between the sensor unit and the corresponding image read position.

According to a seventh aspect of the exemplary embodiments of the present invention, there is provided a correction control device comprising: a correcting unit that performs a filter process on pixels having been read while a document and a sensor unit having light receiving elements arranged in one direction have been relatively moved in a direction intersecting with the one direction; and a setting unit that sets a filter process to be applied by the correcting unit, by making the degree of edge enhancement differ between the one direction based on a target pixel which is a correction target, and the direction intersecting with the one direction.

According to a eighth aspect of the exemplary embodiments of the present invention, there is provided a correction control device comprising: an input unit which receives pixels having been read while a document and a sensor unit having light receiving elements arranged in one direction have been relatively moved in a direction intersecting with the one direction; and a correcting unit that corrects the pixels by making the degree of influence differ between peripheral pixels of the one direction and peripheral pixels of the direction intersecting with the one direction, with reference to a target pixel which is a correction target of the pixels.

According to a ninth aspect of the exemplary embodiments of the present invention, there is provided an image reading apparatus comprising: a sensor unit that includes a plurality of light receiving elements arranged in one direction; a reading unit that reads an image recorded on a document while relatively moving the sensor unit and the document in a direction intersecting with the one direction; a correcting unit that performs a filter process on pixels of an image information unit read by the reading unit; and a setting unit that sets filter coefficients to be applied by the correcting unit, by making the degree of edge enhancement differ between the one direction based on a target pixel which is a correction target, and the direction intersecting with the one direction.

According to a tenth aspect of the exemplary embodiments of the present invention, there is provided a correction control method comprising: when a filter process is performed on every predetermined number of pixels of an image information which has been read by a sensor unit including a plurality of light receiving elements arranged in one direction while the sensor unit and a document having an image recorded thereon have been moved in a direction intersecting with the one direction, setting the filter process by making the degree of edge enhancement differ between the one direction based on a target pixel which is a correction target and the direction intersecting with the one direction.

BRIEF DESCRIPTION OF THE DRAWINGS

Exemplary embodiments of the present invention will be described in detailed based on the following figures wherein:

FIG. 4A is a view illustrating an arrangement pattern of filter coefficients of a reference window of an edge enhancement filter, and FIG. 4B is a chart illustrating the meanings of variables which are the filter coefficients.

FIG. 8 is a flow chart illustrating a filter coefficient setting mode control routine according to the embodiment;

FIG. 9 is a flow chart illustrating an image read control routine according to the embodiment;

FIG. 10 is a view illustrating transitions during filter coefficient setting, and (A) of FIG. 10 shows the pattern of the reference window, and (B) of FIG. 10 shows the patterns of a window for a DADF (hereinafter, referred to simply as DADF window) and a window for a platen (hereinafter, referred to simply as platen window) representing numerical value examples obtained by correcting the filter coefficients on the basis of focal lengths according to read modes, and (C) of FIG. 10 shows the patterns of a DADF window and a platen window representing numerical value examples obtained by changing the filter coefficients in a main scan direction and a sub scan direction;

FIG. 12B is an enlarged view of a reading area;

FIG. 14A is a view illustrating an arrangement pattern of filter coefficients of a reference window of an edge enhancement filter, and FIG. 14B is a chart illustrating the meanings of variables which are the filter coefficients, and FIG. 14C is a front view illustrating a document specifying a target pixel to be subjected to a filter process during image reading, and FIG. 14D is a chart illustrating an arithmetic expression for the filter process;

FIG. 17 is a front view illustrating the states of thin lines before and after an edge enhancement filter process according to the embodiment;

FIG. 18 is a flow chart illustrating a filter coefficient setting mode control routine according to the embodiment;

FIG. 19 is a flow chart illustrating an image read control routine according to the embodiment; and FIG. 20 is a view illustrating transitions during filter coefficient setting, and (A) of FIG. 20 shows the pattern of the reference window, and (B) of FIG. 20 shows the patterns of windows representing numerical value examples of filter coefficients set such that the degree of edge enhancement in a main scan direction and the degree of edge enhancement in a sub scan direction are different with respect to a high-pass filter, and (C) of FIG. 20 shows the patterns of windows generally representing numerical value examples of filter coefficients of a high-pass filter and a low-pass filter.

DETAILED DESCRIPTION

Hereinafter, embodiments of the present invention will be described in detail with reference to the accompanying drawings.

First Embodiment

Figure 1:
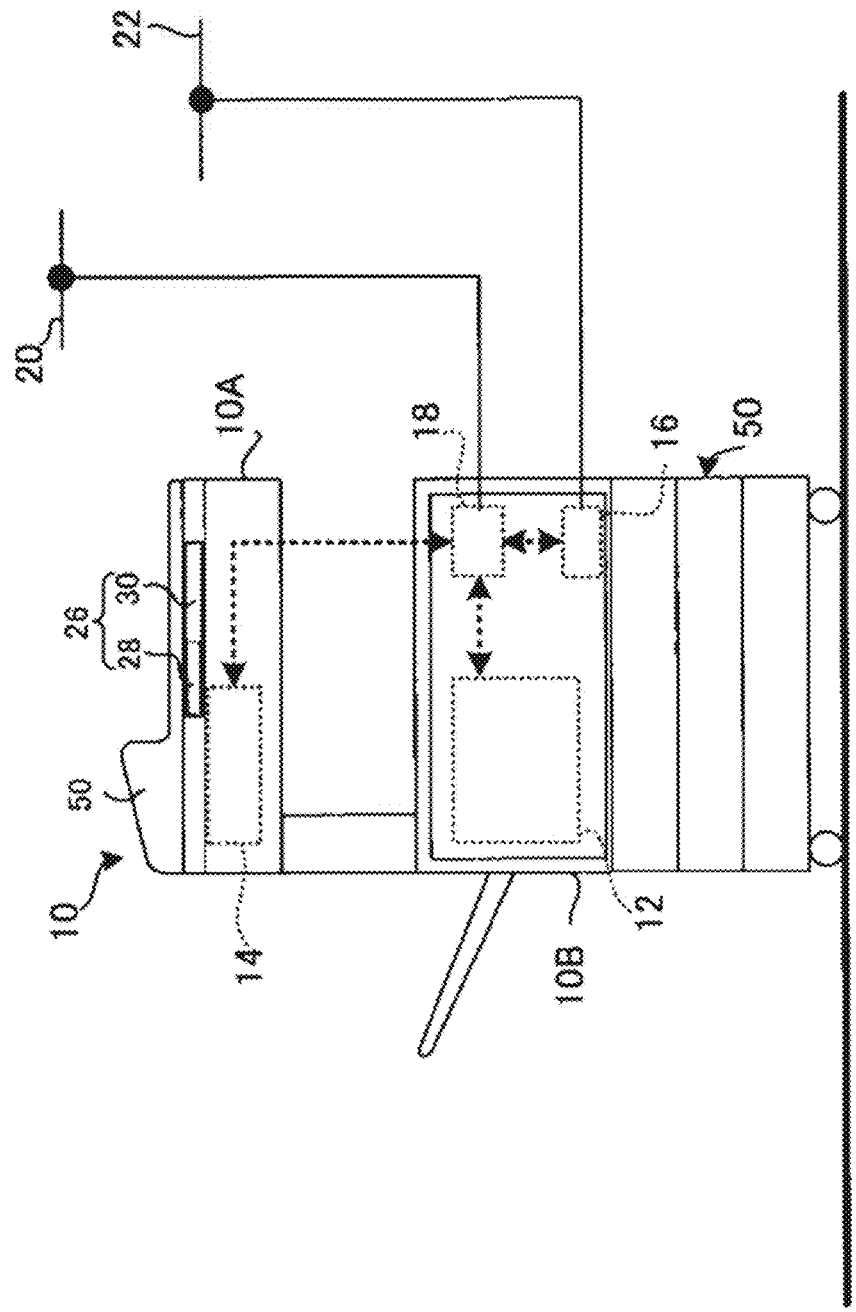
FIG. 1 is a view schematically illustrating an image processing apparatus according to an embodiment.

FIG. 1 shows an image reading apparatus 10 according to a first embodiment.

The image reading apparatus 10 includes an image forming unit 12 for forming images on recording sheets, an image reading unit 14 for reading document images, and a facsimile communication control circuit 16.

The image reading apparatus 10 includes a main controller 18, which controls the image forming unit 12, the image reading unit 14, and the facsimile communication control circuit 16, for example, such that image data obtained by reading document images by the image reading unit 14 is primarily stored, or is transmitted to the image forming unit 12 or the facsimile communication control circuit 16. Also, the image reading unit 14 is covered with an upper casing 10A, and the image forming unit 12, the facsimile communication control circuit 16, and the main controller 18 are covered with a lower casing 10B. At a further lower portion of the lower casing 10B, a plurality of tray units 24 is provided.

Also, on the upper front side of the upper casing 10A covering the image reading unit 14, there is disposed a user interface 26 (hereinafter, also referred to as UI 26) for indicating process operation (service) items including an image reading process, a copying process, an image forming process, and a transmitting/receiving process, and indicating detailed settings of each process operation, and displaying the state of the image reading apparatus 10. The UI 26 includes a touch panel unit 28 which displays a display screen with which an operator can bring a finger or the like into contact, thereby issuing an instruction, and a hard key arrangement unit 30 which includes a plurality of hard keys (not shown) on which the operator can perform a mechanical operation (for example a pushing operation), thereby issuing an instruction.

The main controller 18 is connected to a network communication line network 20 such as the Internet, and the facsimile communication control circuit 16 is connected to a telephone network 22. The main controller 18 has, for example, a function of being connected to a host computer through the network communication line network 20 and receiving image data, or a function of using the telephone network 22 through the facsimile communication control circuit 16 to perform facsimile reception and facsimile transmission.

In the first embodiment, the image forming unit 12, the image reading unit 14, and the facsimile communication control circuit 16 can be used to perform services (processing forms) including scanning, copying, printing, facsimile transmission, facsimile reception, and printing after facsimile reception.

The image forming unit 12 includes photosensitive members, charging units which are provided around the photosensitive members and uniformly charge the photosensitive members, scan exposure units which irradiates the photosensitive members with optical beams on the basis of image data, thereby forming electrostatic latent images, image developing units which develop the electrostatic latent images, transfer units which transfer the developed images on the photosensitive members onto a recording sheet, and cleaning units which clean the surfaces of the photosensitive members after the transferring. Also, the image forming unit 12 includes a fixing unit, which is provided on a recording sheet conveyance path and fixes the image on the recording sheet after the transferring.

Figure 2A:
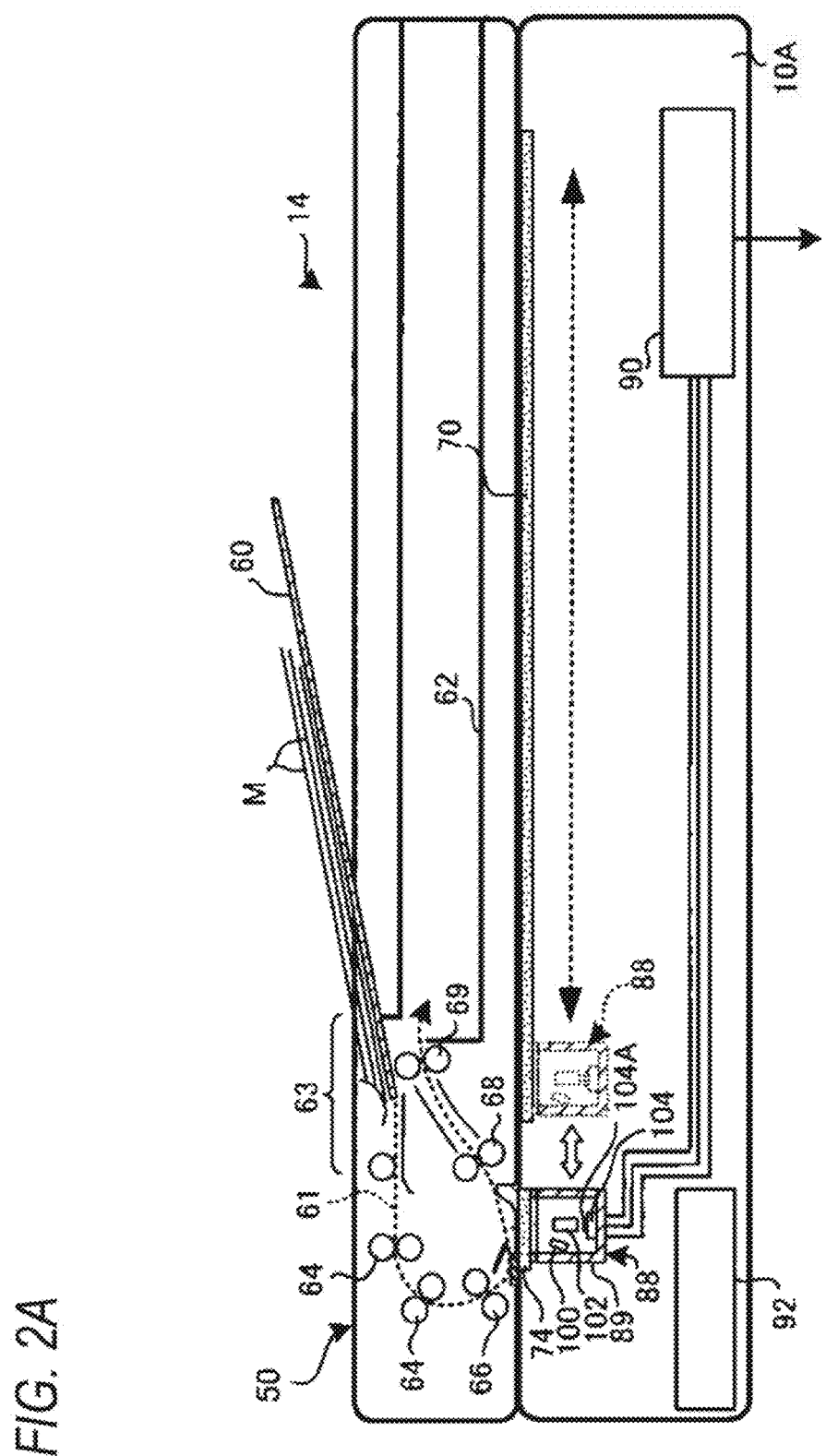
FIG. 2A is a cross-sectional view schematically illustrating an example of the configuration of an image reading unit according to the embodiment.

As shown in FIG. 2A, on the top of the upper casing 10A accommodating the image reading unit 14, an automatic document feeder 50 is provided.

Also, at the upper surface of the upper casing 10A, that is, at a surface facing the automatic document feeder 50, there is provided read glass 70 for mounting a document for image reading.

The automatic document feeder 50 includes a document platen 60 on which documents are mounted, and a discharge platen 62 onto which documents subjected to image reading are discharged.

A document conveyance path 61 from the document platen 60 to the discharge platen 62 has an arc-shaped portion, thereby having a function of reversing documents M.

On the most upstream side of the document conveyance path 61, a sheet sending unit 63 is provided. The sheet sending unit 63 picks up the documents M mounted on the document platen 60. The document conveyance path 61 is formed by a plurality of roller pairs (pairs of sending rollers 64, a pair of aligning rollers 66, a pair of out rollers 68, and a pair of discharging rollers 69). Also, at an appropriate position of the document conveyance path 61, there is provided a guide plate 65 for guiding conveyance of each document M.

The pairs of sending rollers 64 feed the uppermost document of the documents sent from the sheet sending unit 63 to the inside while reversing the corresponding document.

The pair of aligning rollers 66 conveys the document M sent from the upstream side such that the document M passes an area (reading area) facing road glass 74 at a controlled reading timing.

Figure 2B:
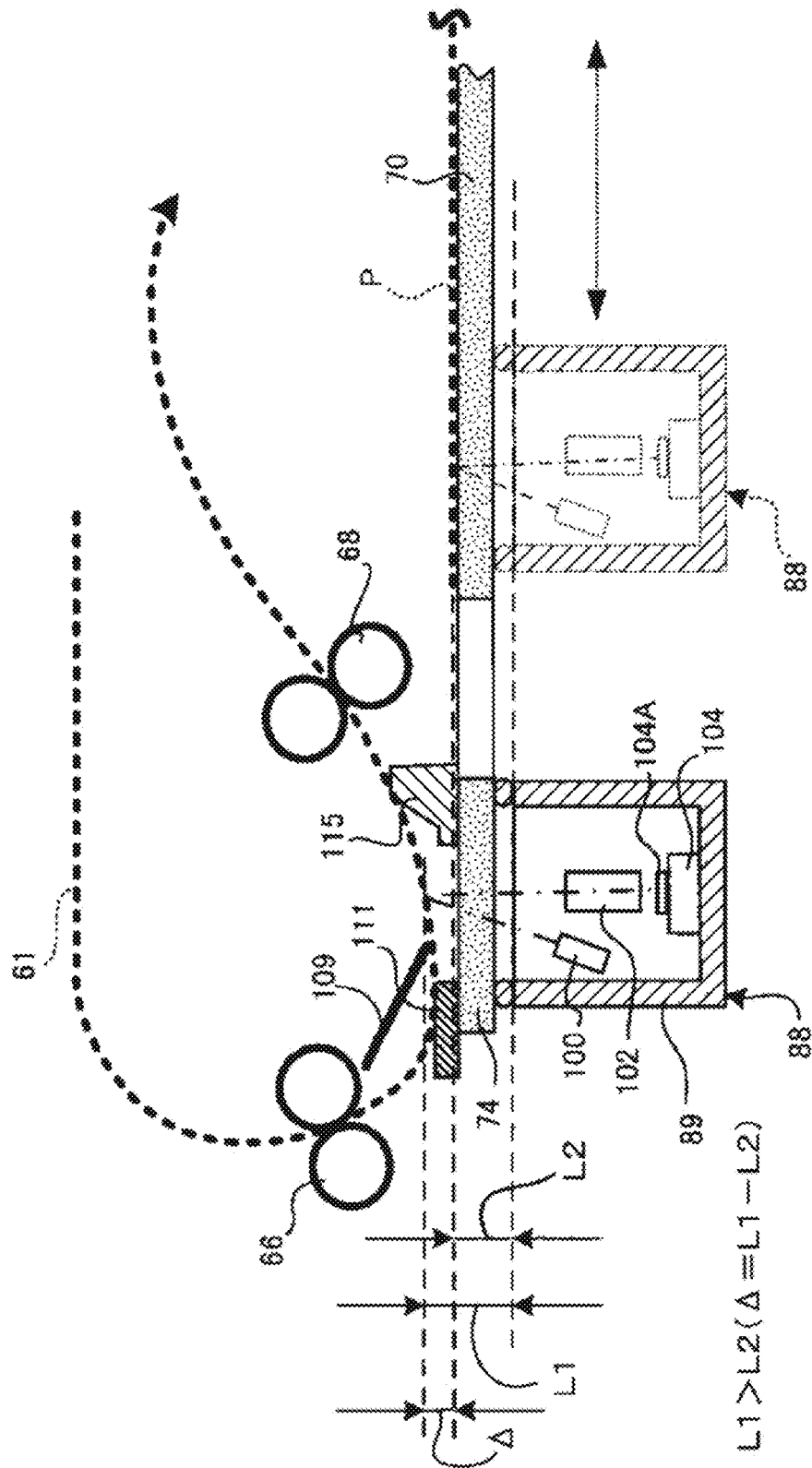
FIG. 2B is an enlarged view of a reading area.

FIG. 2B shows details of the document conveyance path 61 in the reading area.

As shown in FIG. 2B, on the upstream side in a portion of the document conveyance path positioned on the read glass 74, there is disposed a thin elastic film 109 for guiding the document M to the read glass side. Below the elastic film 109, a pad 111 is supported on the top of the left end of the read glass 74. The pad 111 is formed of, for example, a material having friction lower than that of the rigid guide plate, so as to guide the document M guided downward by the elastic film 109 to the right side of FIG. 2B. The document M guided by the pad 111 passes over the read glass 74 with a predetermined gap G, and is guided by a jump guide plate 115, and is conveyed by the pair of out rollers 68 positioned on the downstream side.

Below the read glass 74, a CIS unit 88 which is an example of a contact type sensor (to be described below) according to the first embodiment stands by. Therefore, the image of the document M is read by the CIS unit 88.

The pair of out rollers 68 and the pair of discharging rollers 69 discharge the read document M onto the discharge platen 62.

As shown in FIG. 2A, the image reading unit 14 accommodated in the upper casing 10A includes the CIS (contact image sensor) unit 88, a signal processing unit 90 which processes image information signals obtaining by reading images by the CIS unit 88, and a scan control unit 92 which controls scanning of the CIS unit 88.

As shown in FIG. 2B, the CIS unit 88 is accommodated in a casing 89 whose longitudinal direction is set in a direction away from a viewer of FIG. 2B, and is configured to be movable below the read glass 74 and below the read glass 70 along a rail mechanism unit (not shown).

In this case, below the read glass 74, the CIS unit 88 is fixed at a predetermined position (see a solid line position of FIG. 2B) so as to sequentially face the image surface of each document M sent along the document conveyance path 61. That is, the CIS unit 88 performs sub scanning (hereinafter, referred to as DADF sub scanning) on each document M sent from the automatic document feeder 50.

Meanwhile, below the read glass 70, the CIS unit 88 moves forward and backward within a predetermined range. The CIS unit 88 shown by a chain line of FIG. 2B is at a home position in the forward and backward movement.

Here, in a case where a document M is positioned on the upper surface of the read glass 70, one of forward movement and backward movement (a forward path or a backward path) is defined as sub scanning (hereinafter, referred to as platen sub scanning) for reading an image from the corresponding document M.

During DADF sub scanning, the scan control unit 92 performs control, thereby positioning the CIS unit 88 at the predetermined position below the read glass 74. Meanwhile, during the platen sub scanning, the scan control unit 92 performs control, thereby moving the CIS unit 88 forward and backward below the read glass 70, at a predetermined speed.

The CIS unit 88 includes a light source 100, a rod lens array 102, and a sensor substrate 104 having photoelectric conversion elements 104A mounted thereon.

The light source 100 is for illuminating each document M, and includes light emitting elements having the emission wavelengths of colors such as red (R), green (G), and blue (B), and is controlled such that the light emitting elements are sequentially or selectively or simultaneously turned on. Also, light emitted from the light source 100 is radiated onto each document M passing through the reading area positioned on the read glass 70, by a light guide member (not shown) elongated and disposed in the width direction of the corresponding document M (a direction away from a viewer of FIG. 2B).

The rod lens array 102 includes a plurality of erect non-magnification image formation type imaging elements arranged in the same direction as the longitudinal direction of the light guide member, and focuses light reflected from each document M, on the photoelectric conversion elements 104A mounted on the sensor substrate 104.

The photoelectric conversion element 104A are arranged along the longitudinal direction of the rod lens array 102, and light reflected from each document M is focused on the photoelectric conversion elements 104A sequentially from one side to the other side of the longitudinal direction, through the rod lens array 102 (main scanning common to DADF sub scanning and platen sub scanning).

The photoelectric conversion elements 104A covert the reflected light into electric signals. Also, the photoelectric conversion elements 104A convert all reflected light of individual colors of red (R), green (G), and blue (B) into electric signals, whereby main scanning of a color image is performed, and the corresponding electric signals are transmitted to the signal processing unit 90.

Meanwhile, as shown in FIG. 2B, in the image reading unit 14, in a case where a document M is sent along the document conveyance path 61 from the automatic document feeder 50, when the document M passes over the read glass 74, the CIS unit 88 reads an image from the document M (DADF sub scanning) (hereinafter, referred to as DADF reading). During DADF reading, a distance from the document M to the upper end surface of the CIS unit 88 is L1. Also, in a case where a document M is positioned on the read glass 70, the CIS unit 88 reads an image from the document M while moving below the read glass 70 (platen sub scanning) (hereinafter, referred to as platen reading). During platen reading, a distance from the document M to the upper end surface of the CIS unit 88 is L2. Between the distance L1 and the distance L2, a difference Δ occurs.

Although the read glass 70 and the read glass 74 are on the same plane, during platen reading, the CIS unit 88 reads an image while a document M is in contact with the read glass 70, whereas during DADF reading, a document M is conveyed over the read glass 74 with the gap G such that the document M is prevented from moving (sliding) while being in contact with the read glass 74. This is one factor for the difference Δ. Also, in a case where there is a difference in level between the upper surfaces of the read glass 70 and the read glass 74, this level difference may be one factor for the difference Δ.

The CIS unit 88 has a shallower focal depth, for example, as compared to a charge-coupled device (CCD). For this reason, in a case where the CIS unit 88 is in focus when the CIS unit 88 is positioned on one side of the read glass (70) side and the read glass (74) side, due to the difference Δ, the CIS unit 88 may be out of focus when the CIS unit 88 is positioned on the other side, whereby a difference in image quality may occur between images read on both sides.

Also, with respect to the focal depth which becomes a reference during design, the CIS unit 88 may be out of focus not only during DADF reading but also during platen reading, due to a deviation in the device including the CIS unit 88, and errors including errors occurring during assembling (hereinafter, generally referred to as device-dependent errors).

For this reason, in the first embodiment, defocusing due to the device-dependent errors is recognized, and image processing is performed on image data read from each document M, whereby degradation in image quality is suppressed.

In the first embodiment, the recognition is an analysis based on a distance measurement document for measuring a distance from the CIS unit to is document M, and the image processing is, more specifically, art edge enhancement filter process of performing filtering with filter coefficients based on the distance obtained by the analysis. The edge enhancement filter process is an example of a filter process according to the present example.

Figure 3:
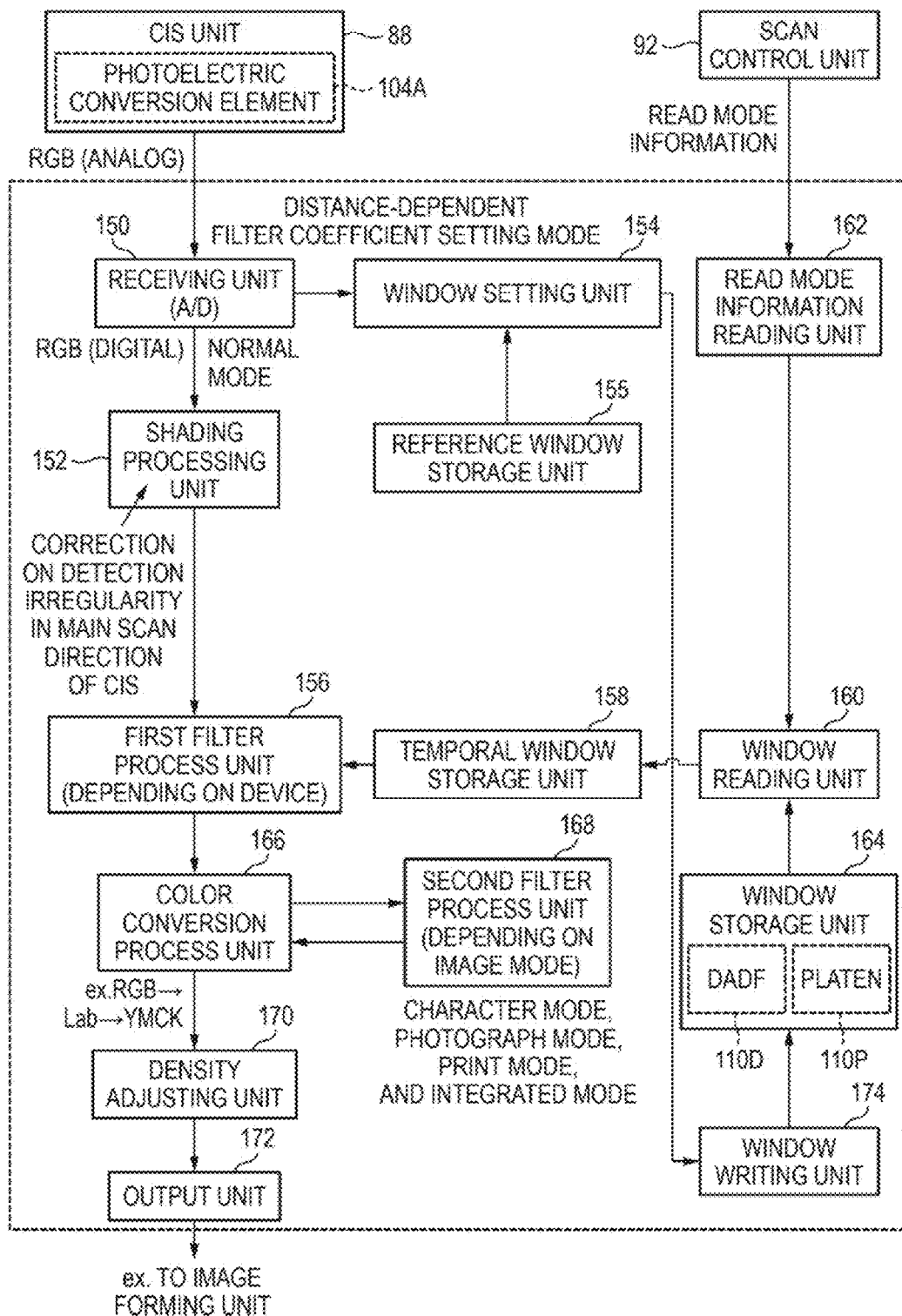
FIG. 3 is a view illustrating functional blocks for image processing control in signal processing of the image reading unit according to the embodiment.

FIG. 3 is a block diagram functionally illustrating the signal processing unit 90 of the image reading unit 14. However, this block diagram does not limit the hardware configuration of the signal processing unit 90.

The photoelectric conversion elements 104A of the CIS unit 88 are connected to a receiving unit 150, and convert light into electric signals (analog electric signals), and transmit the electric signals to the receiving unit 150.

The receiving unit 150 converts at least the received (analog) electric signals of individual colors R, G, and B into digital signals. In a normal mode, the receiving unit 150 transmits the digital signals to a shading processing unit 152.

Meanwhile, in a distance-dependent filter coefficient setting mode, the digital signals (image information) is transmitted to a window setting unit 154. The distance-dependent filter coefficient setting mode will be described below.

In the shading processing unit 152, there has been stored in advance a correction table for correcting variations of output signals of the photoelectric conversion elements 104A arranged in the main scan direction in the CIS unit 88. That is, for example, in a case where a document with a constant density in the main scan direction has been read, the shading processing unit 152 corrects differences between outputs such that the outputs become a constant value.

The shading processing unit 152 is connected to a first filter process unit 156. The first filter process unit 156 has a function of correcting degradation in image quality (such as blurring and smear) caused by a difference between a designed focal position and a focal position during actual reading.

This degradation in image quality due to a difference in focal position is corrected by an edge enhancement filter process.

(Principle of Edge Enhancement Filter Process)

FIGS. 4A to 4D are for explaining the principle of the edge enhancement filter process to be a reference.

FIG. 4A shows a reference filter coefficient table 110 (hereinafter, also referred to as reference window 110) which has the total of 25 segments arranged in a 5-by-5 matrix, and whose individual segments corresponds respectively to pixels read by the photoelectric conversion elements 104A. Each pixel to be subjected to the filter process is positioned at the center of the reference window 110 (see reference symbol "A" in FIG. 4A).

Nine reference symbols "A" to "I" are assigned to the individual segments of the reference window 110, and the nine reference symbols become different filter coefficients.

In the reference window 110 of FIG. 4A, the reference symbols are arranged so as to be horizontally and vertically symmetric, whereby pixels of 25 segments can be processed with the nine reference symbols (nine filter coefficients).

FIG. 4B is a chart illustrating the filter coefficients of the individual reference symbols. "Coef (REFERENCE SYMBOL)" is a predetermined numerical value, and is a filter coefficient relative to the corresponding reference symbol of the reference window 110. For example, "Coef A" is a predetermined numerical value, and is a filter coefficient relative to the reference symbol "A" of the reference window 110. Hereinafter, "Coef B" to "Coef I" are filter coefficients relative to the reference symbols "B" to "I".

Also, "FillVal" is a pixel value which is used when the photoelectric conversion elements 104A are positioned outside the image reading area of a document M.

Figures 4C, 4D:
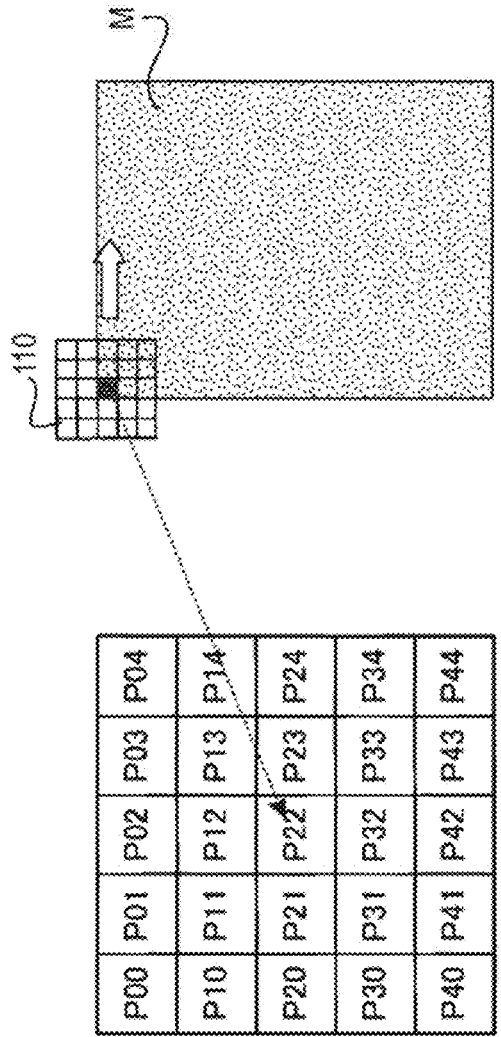
FIG. 4C is a front view illustrating a document specifying a target pixel to be subjected to a filter process during image reading.
FIG. 4D is a chart illustrating an arithmetic expression for the filter process.

The right view of FIG. 4C shows the correspondence disposition state of the reference window 110 immediately after reading of the document M starts, that is, when scanning (main scanning and sub scanning) is started from the upper left corner of the document M. In this disposition state of the reference window 110, the photoelectric conversion elements 104A reads read information items P as shown in the left view of FIG. 4C. Also, in each two digit number after the reference symbol "P", the units digit and the tens digit represent the main scan direction and the sub scan direction, respectively, and the read information items P of the total of 25 segments are distinguished by P00 to P04, P10 to P14, P20 to P24, P30 to P34, and P40 to P44.

Here, in a case of performing a filter process on a target pixel (P22 in FIG. 4C), the output of the target pixel P22 is obtained by an arithmetic operation shown in FIG. 4D.

That is, the output of the target pixel P22 is calculated by the following arithmetic expression (1).

$$P22 = P00 \times CoefI + P01 \times CoefH + P02 \times CoefF + \\ P03 \times CoefH + P04 \times CoefI + P10 \times CoefG + P11 \times CoefE + \\ P12 \times CoefC + P13 \times CoefE + P14 \times CoefG + \\ P20 \times CoefD + P21 \times CoefB + P22 \times CoefA + P23 \times CoefB + \\ P24 \times CoefD + P30 \times CoefG + P31 \times CoefE + \\ P32 \times CoefC + P33 \times CoefE + P34 \times CoefG + P40 \times CoefI + \\ P41 \times CoefH + P42 \times CoefF + P43 \times CoefH + P44 \times CoefI \quad (1)$$

Also, in the above example, since segments P00 to P04, P10 to P14, P20, P21, P30, P31, P40, and P41 are positioned outside the image reading area, "FillVal" is applied as their pixel values. Also, as the filter coefficients of them, the same coefficients as those in a case where any section is not positioned outside of the image reading area are used.

Figure 5A:
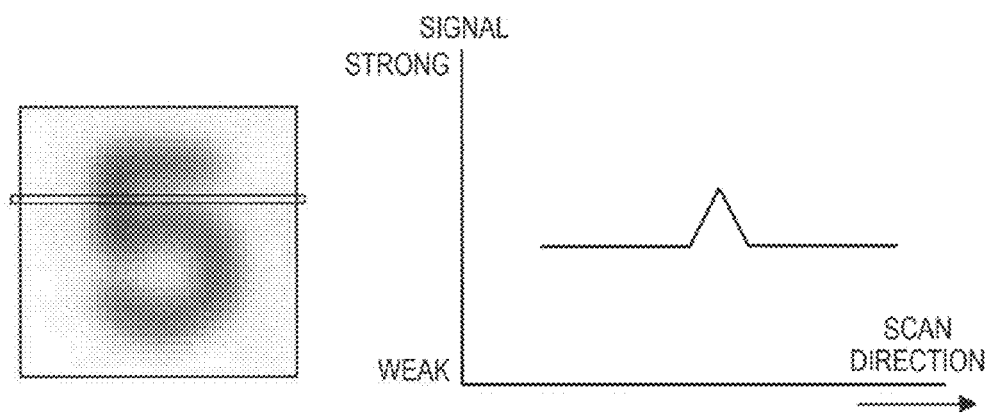
FIG. 5A is a front view illustrating a character image before a filter process, and is a characteristic diagram illustrating the enhancement degree of the character image.
Figure 5B:
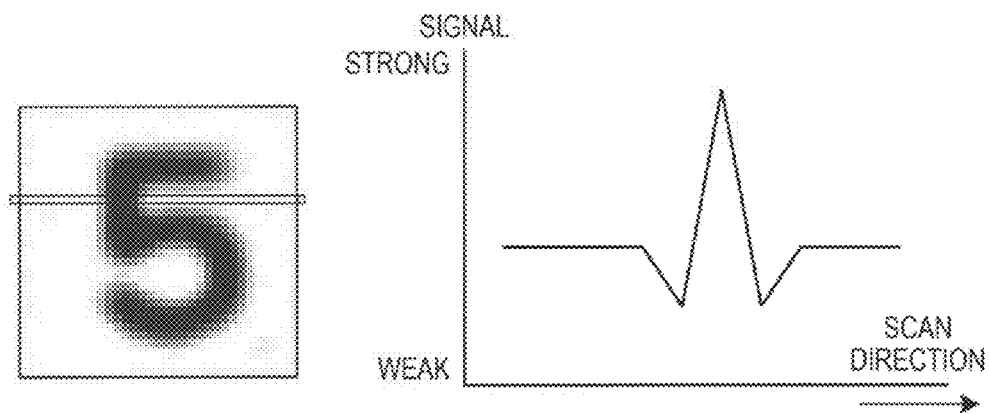
FIG. 5B is a front view illustrating the character image after a filter process, and is a characteristic diagram illustrating the enhancement degree of the character image.

FIGS. 5A and 5B are characteristic diagrams illustrating a relative difference between the density of the target pixel and the density of the peripheral pixels of the target pixel according to an edge enhancement process.

FIG. 5A shows image information received by the receiving unit 150 (see FIG. 3), and FIG. 5B shows image information obtained by an edge enhancement process.

From FIGS. 5A and 5B, it can be seen that the difference in density between the target pixel and the peripheral pixels becomes larger by the edge enhancement process, and thus degradation in image quality such as blurring and smear due to a deviation in the focal length can be corrected by the filter process (the edge enhancement process).

(Filter Process Based on Distance Difference Between DADF Reading and Platen Reading)

Here, the first filter process unit 156 (see FIG. 3) of the first embodiment corrects degradation in image quality (such as blurring and smear) depending on the difference Δ(=L1−L2) (FIG. 2B) representing the difference in focal position between DADF reading and platen reading, by use of the principle of the filter process described above.

That is, filter coefficient tables (a window 110D for the DADF, and a window 110P for the platen) independent from each other are set for DADF reading and platen reading, and according each read mode, a window (the window 110D for the DADF or the window 110P for the platen) is selected and applied.

That is, as shown in FIG. 3, the first filter process unit 156 is connected to a temporal window storage unit 158. In the temporal window storage unit 158, there has been stored a window (the window 110D for the DADF or the window 110P for the platen) having filter coefficients corresponding to the read mode (DADF reading or platen reading) and arranged in a matrix.

The temporal window storage unit 158 is connected to a window reading unit 160. The window reading unit 160 is connected to a read mode information reading unit 162 and a window storage unit 164.

Here the read mode information reading unit 162 reads read mode information (DADF reading or platen reading) from the scan control unit 92, and transmits the read mode information to the window reading unit 160. The window reading unit 160 reads any one of the window 110D for the DADF having filter coefficients for the DADF, and the window 110P for the platen having filter coefficients for the platen, from the window storage unit 164, on the basis of the read mode information, and stores the read window in the temporal window storage unit 158. That is, from that moment, the temporal window storage unit 158 sequentially updates the window (the window 110D for the DADF or the window 110P for the platen), according to the read mode when image reading is performed by the image reading unit 14.

Also, the window 110D for the DADF and the window 110P for the platen are generated by reading the pattern of a distance measurement document M1 (see FIG. 6A) or a distance measurement document M2 (see FIG. 7A) and are stored in the window storage unit 164. The procedure of generating the windows will be described below.

The first filter process unit 156 calculates the density of each pixel on the basis of the above described arithmetic expression (1) by use of the filter coefficients of the window (the window 110D for the DADF or the window 110P for the platen) stored in the temporal window storage unit 158.

The image information subjected to the filter process in the first filter process unit 156 is transmitted to a color conversion process unit 166. The color conversion process unit 166 converts input RGB image information into, for example, CMYK image information for image forming of the image forming unit 12. During this color conversion, for example, color conversion from RGB into CMYK through a Lab color space may be performed (RGB→L*a*b→CMYK). Also, the color conversion is not limited to CMYK, and may be conversion into a designated color space.

The color conversion process unit 166 is connected to a second filter process unit 168. The second filter process unit 168 performs a filter process depending on an image mode. For example, document images are classified into a charter mode, a photograph mode, a print mode, and an integrated mode, and the second filter process unit 168 performs a filter process appropriate for each image. The second filter process unit 168 uses, for example, a non-linear filter, and removes noise and mesh-dot components without damaging edge components. More specifically, a non-linear smoothing filter and a non-linear edge enhancement filter are applied. The non-linear smoothing filter removes noise and mesh-dot components while keeping the edge portion. Also, the non-linear edge enhancement filter enhances only the edge portion without enhancing noise.

Also, the color conversion process unit 166 is connected to a density adjusting unit 170. The density adjusting unit 170 corrects uniformly all pixels, for example, with respect to the image information subjected to the filter process or the color converting process, such that the final average density of all pixels becomes a predetermined grayscale value (for example, an intermediate value). However, adjustment of the density adjusting unit 170 is not limited to the above described example.

The image information subjected to the density adjustment of the density adjusting unit 170 is output to, for example, the image forming unit 12, through an output unit 172. Alternatively, the density adjusting unit 170 may transmit the image information to a PC having issued the image reading instruction, a server, or others.

(Generation of Window Having Filter Coefficients Arranged in Matrix)

In the first embodiment, in each of DADF reading and platen reading different in focal length, filter coefficients for performing an optimal edge enhancement process are set.

Setting of the filter coefficients is performed in the distance-dependent filter coefficient setting mode, unlikely in the above described normal mode. In the filter coefficient setting mode, if the receiving unit 150 receives image information, the receiving unit 150 performs A/D conversion on the image information, and transmits the image information to the window setting unit 154.

Also, in the filter coefficient setting mode, in order to set corresponding filter coefficients, the distance measurement document M1 (see FIG. 6A), or the distance measurement document M2 (see FIG. 7A) is applied.

(Application of Distance Measurement Document M1 Which is First Example)

Figure 6A:
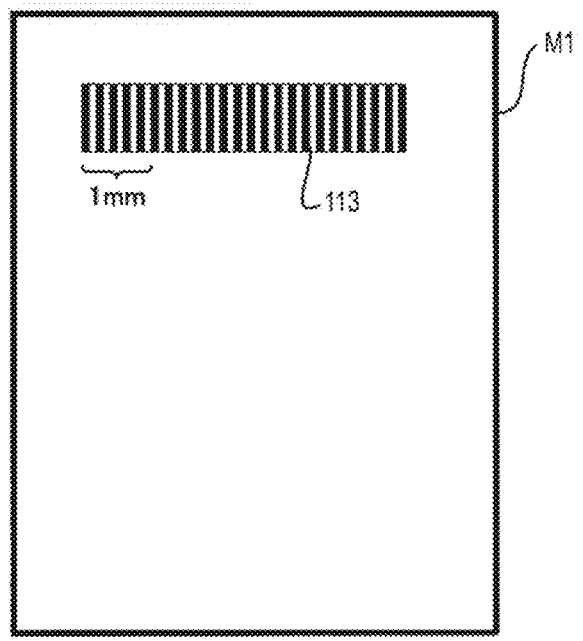
FIG. 6A is a front view illustrating a distance measurement document which is a first example.

As shown in FIG. 6A, the distance measurement document M1 which is as first example has a CTF (resolution) measurement pattern 113 printed thereon. The CTF measurement pattern 113 is a pattern having five pairs of black lines and white lines alternately existing within 1 mm (5 line pairs per mm), and the black and white lines are vertical. Therefore, the distance measurement document M1 of FIG. 6A can be used to measure the resolution in the main scan direction.

In the distance-dependent filter coefficient setting mode, an image reading process is performed using the distance measurement document M1, and on the basis of read image information, the window setting unit 154 (see FIG. 3) calculates the resolution by the following arithmetic expression (2).

CTF=[(Black Line Density)−(White Line Density)]/
[(Black Reference Density)−(White Reference Density)]=100[%]  (2)

For example, if the black line density is 160, the white line density is 70, the black reference density is 200, and the white reference density is 50, according to the above arithmetic expression (2), the CTF value becomes 60%.

Figure 6B:
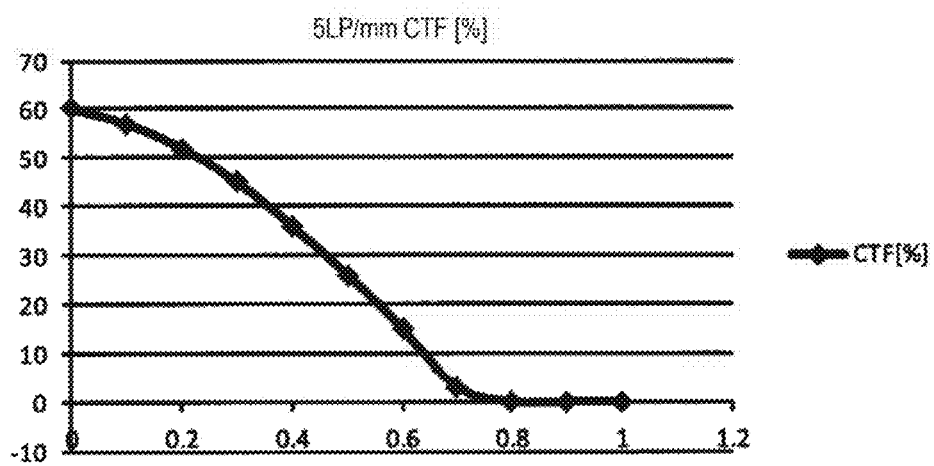
FIG. 6B is a characteristic diagram illustrating the relation between distance and CTF based on a pattern of FIG. 6A.

FIG. 6B is a characteristic diagram illustrating the relation between the CTF value and the distance. In the characteristic diagram of FIG. 6B, the relation between the CTF value and the distance is represented by as quadratic curve, and thus it is possible to estimate the distance from the CTF value. The CTF value 60% which is the above described calculation result is the starting point of the characteristic diagram of FIG. 6B, and represents that the CIS unit is in focus. For example, the characteristic diagram of FIG. 6B is stored in a storage medium which is readable by the window setting unit 154 shown in FIG. 3.

As shown in FIG. 3, in DADF reading, with reference to the filter coefficients of the reference window 110 taken from a reference window storage unit 155, the window setting unit 154 sets the individual segments of the window (coefficient values corresponding to the reference symbols "A" to "I" shown in FIG. 4A), on the basis of the estimated distance, on the basis of the estimated distance, and transmits the set window 110D for the DADF, to a window writing unit 174. That is, the window setting unit 154 has the function of storing the characteristic diagram, the function of calculating the resolution, and the function of estimating the distance.

The window writing unit 174 stores the received window 110D for the DADF in the window storage unit 164.

Meanwhile, in platen reading, with reference to the filter coefficients of the reference window taken from the reference window storage unit 155, the window setting unit 154 sets the individual segments of the window (coefficient values corresponding to the reference symbols "A" to "I" shown in FIG. 4A), on the basis of the estimated distance, and transmits the set window 110P for the platen, to the window writing unit 174.

The window writing unit 174 stores the received window 110P for the platen in the window storage unit 164.

Also, the reference window 110 stored in the reference window storage unit 155 has filter coefficients set during design.

(Application of Distance Measurement Document M2 Which is Second Example)

Figure 7A:
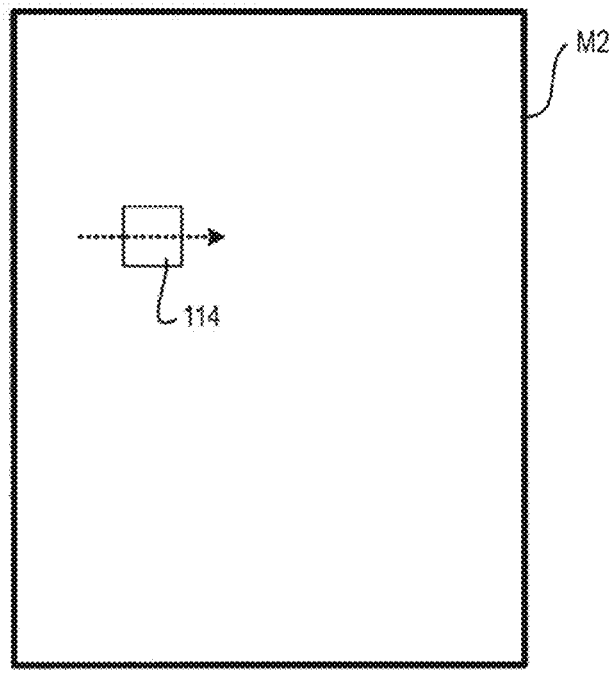
FIG. 7A is a front view illustrating a distance measurement document which is a second example.

As shown in FIG. 7A, the distance measurement document M2 which is a second example has a density measurement pattern 114 printed thereon. The density measurement pattern 114 is a rectangular white reference pattern, and is not influenced by the resolution of the CIS unit 88 (see FIG. 2), and is generated, for example, in the form of a square pattern of 20 mm by 20 ram.

In the filter coefficient setting mode, an image reading process is performed using the distance measurement document M2, and the window setting unit 154 (see FIG. 3) obtains the density of read image information.

Figure 7B:
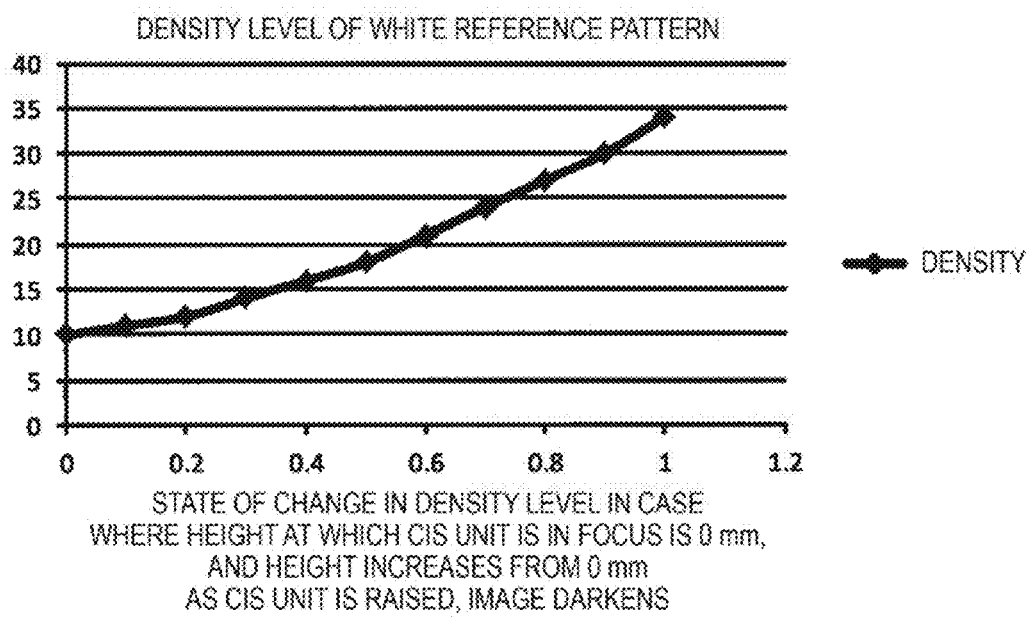
FIG. 7B is a characteristic diagram illustrating the relation between distance and density based on a pattern of FIG. 7A.

FIG. 7B is a characteristic diagram illustrating the relation between the density and the distance. In the characteristic diagram of FIG. 7B, the relation between the density of the density measurement pattern 114 and the distance is a proportional relation which is represented by a linear portion of a quadratic curve, and thus it is possible to estimate the distance from the density of the density measurement pattern 114. For example, the characteristic diagram of FIG. 7B is stored in a storage medium which is readable by the window setting unit 154 shown in FIG.

As shown in FIG. 3, in DADF reading, with reference to the filter coefficients of the reference window taken from the reference window storage unit 155, the window setting unit 154 sets the individual segments of the window (the coefficient values corresponding to reference symbols "A" to "I" shown in FIG. 4A), on the basis of the estimated distance, and transmits the set window 110D for the DADF, to a window writing unit 174. That is, the window setting unit 154 has the function of storing the characteristic diagram, the function of calculating the resolution, and the function of estimating the distance.

The window writing unit 174 stores the received window 110D for the DADF in the window storage unit 164.

Meanwhile, in platen reading, with reference to the filter coefficients of the reference window taken from the reference window storage unit 155, the window setting unit 154 sets the individual segments of the window (coefficient values corresponding to the reference symbols "A" to "I" shown in FIG. 4A), on the basis of the estimated distance, and transmits the set window 110P for the platen, to the window writing unit 174.

The window writing unit 174 stores the received window 110P for the platen in the window storage unit 164.

Also, the reference window 110 stored in the reference window storage unit 155 has filter coefficients set during design.

Hereinafter, the effects of the first embodiment will be described.

(Filter Coefficient Setting Mode Control Routine)

Filter coefficient setting for setting the windows (the window 110D for the DADF and the window 110P for the platen) having filter coefficients assigned for the DADF and the platen according to the flow chart of FIG. 8 will be described. Also, in FIG. 8, the distance measurement document M1 according to the first example (see FIGS. 6A and 6B) has been used.

In STEP 200, the user is instructed to load the distance measurement document M1 on the automatic document feeder 50. For example, it can be considered to display a message for urging the user to load the distance measurement document M1, on the UI 26.

Next, in STEP 202, whether a read start instruction has been received is determined. If the determination result is positive, the routine proceeds to STEP 204 in which document image read control is performed on the CIS unit 88. Here, the read control is performed such that the CIS unit 88 is fixed below the read glass 74 and reads the conveyed distance measurement document M1.

Subsequently, in STEP 206, image information (the CTF measurement pattern 113 shown in FIG. 6A) read from the document M1 is received. Next, in STEP 208, an initial process including A/D conversion is performed on the image information, and the image information (which is digital information) is transmitted to the window setting unit 154.

Next, in STEP 210, the image information is analyzed, and the CTF value is calculated on the basis of the arithmetic expression (2). Subsequently, in STEP 212, on the basis of the characteristic diagram of FIG. 6B, the distance is estimated from the CTF value.

Next, in STEP 214, the reference window 110 is corrected on the basis of the estimated distance, whereby the window 110D for the DADF is generated. Subsequently, in STEP S216, the window 110D is stored in the window storage unit 164. Then, generation of the window 110D for the DADF finishes. Subsequently, generation of the window 110P for the platen is performed.

In STEP 218, the user is instructed to load the distance measurement document M1 on the read glass 70. For example, it can be considered to display a message for urging the user to load the distance measurement document M1, on the UI 26.

Next, in STEP 220, whether a read start instruction has been received is determined. If the determination result is positive, the routine proceeds to STEP 222 in which document image read control is performed on the CIS unit 88. Here, the read control is performed, such that the CIS unit 88 moves to the home position below the read glass 70, and reciprocates from the home position, thereby reading the distance measurement document M1 fixed on top of the read glass 70.

Subsequently, in STEP 224, read image information is received. Next, in STEP 226, an initial process including A/D conversion is performed on the image information, and the image information (which is digital information) is transmitted to the window setting unit 154.

Next, in STEP 228, the image information is analyzed, and the CTF value is calculated on the basis of the arithmetic expression (2). Subsequently, in STEP 230, On the basis of the characteristic diagram of FIG. 6B, the distance is estimated from the CTF value.

Next, in STEP 232, the reference window 110 is corrected on the basis of the estimated distance, whereby the window 110P for the platen is generated. Subsequently, in STEP S234, the window 110P is stored in the window storage unit 164. Then, generation of the window 110D for the DADF finishes, and the routine finishes.

In FIG. 8, generation of the window 110D for the DADF and generation of the window 110P for the platen are sequentially performed. However, the generation order may be reversed. Also, DADF reading and platen reading of the document M1 may be performed in advance, and the generation of the window 110D for the DADF and generation of the window 110P for the platen may be performed in parallel by time division. Also, the generation of the window 110D for the DADF and generation of the window 110P for the platen may be performed independently from each other by separate flow charts.

(Image Read Control Routine)

FIG. 9 is a flow chart illustrating an image read control routine which is in the normal mode.

The image read control of the normal mode is based on the premise that the filter coefficient setting of the flow chart of FIG. 8 has finished and the window 110D for the DADF and the window 110P for the platen have been stored in the window storage unit 164.

In STEP 250, whether any document M has been loaded is determined. In this determination, for example, by signals of sheet size sensors, it is possible to determine whether any document has been loaded on the automatic document feeder 50 or on top of the read glass 70.

In a case where the determination result of STEP 250 is negative, the image read control routine finishes. Meanwhile, in a case where the determination result of STEP 250 is positive, the image read control routine proceeds to STEP 252.

In STEP 252, a read mode is determined. In a case where it is determined that a document M has been loaded on the automatic document feeder 50, in STEP 252, a DADF reading mode is determined. Then, in STEP 254, the window 110D for the DADF is read from the window storage unit 164. Then, the image read control routine proceeds to STEP 258.

Meanwhile, in a case where it is determined that a document M has been loaded on the read glass 70, in STEP 252, a platen reading mode is determined. Then, in STEP 256, the window 110P for the platen is read from the window storage unit 164. Then, the image read control routine proceeds to STEP 258.

In STEP 258, the read window is stored in the temporal window storage unit 158. Then, the image read control routine proceeds to STEP 260. In STEP 260, whether a read start instruction has been received is determined. If the determination result is negative, the image read control routine proceeds to STEP 262 in which whether a stop instruction has been received is determined. If the determination result of STEP 262 is negative, the image read control routine returns to STEP 260, and STEP 260 and STEP 262 are repeated until the determination result of STEP 260 or STEP 262 becomes positive.

If the determination result of STEP 262 becomes positive, document reading is stopped, and the image read control routine finishes. Meanwhile, if the determination result of STEP 260 becomes positive, the image read control routine proceeds to STEP 264 in which document image read control based on the read mode is performed on the CIS unit 88.

In a case of the DADF reading mode, the read control is performed such that the CIS unit 88 is fixed below the read glass 74 and reads the document M conveyed along the document conveyance path 61.

Meanwhile, in a case of the platen reading mode, the read control is performed, such that the CIS unit 88 moves to the home position below the read glass 70, and reciprocates from the home position, thereby reading the document M fixed on top of the read glass 70.

Next, in STEP 266, read image information (analog information) is received. Subsequently, in STEP 268, an initial process including A/D conversion is performed on the image information. Then, in STEP 270, a shading process is performed on the image information.

Next, in STEP 272, the window stored in the temporal window storage unit 158 is read. Subsequently, in STEP 274, a device-dependent filter process is performed. In this case, since the window 110D for the DADF or the window 110P for the platen has been stored on the basis of the read mode in the temporal window storage unit 158, a filter process (edge enhancement process) appropriate for the focal length of the read mode is performed.

Therefore, in every read mode, it is possible to resolve blurring and smear without changes in image quality in the DADF reading mode and the platen reading mode.

Next, in STEP 276, a color converting process is performed. Subsequently, in STEP 278, a filter process depending on the image mode (the charter mode, the photograph mode, the print mode, or the integrated mode) is performed. Then, the image reading control routine proceeds to STEP 280. For example, if a transmission destination is the image forming unit 12, in the color converting process, color conversion from RGB into CMYK through a Lab color space is performed.

In STEP 280, density adjustment is performed. Then, the image reading control routine proceeds to STEP 282 in which the image information is output to, for example, the image forming unit 12.

(Filter Coefficient Adjustment in Scan Direction)

Also, in the first embodiment, even if the filter coefficients are corrected on the basis of the focal length difference between DADF reading and platen reading, basically, the arrangement of the filter coefficients is maintained in a vertically and horizontally symmetric form (see (B) of FIG. 10), like in the reference window 110 (see (A) of FIG. 10).

However, in image reading of the CIS unit 88, between the main scan direction and the sub scan direction, a difference in image quality (the degree of blurring and smear) may be generated. Especially, blurring and smear in the main scan direction become more remarkable than those in the sub scan direction.

For this reason, against the principle (vertical and horizontal symmetry) of the reference window 110, the filter coefficients may be set such that numerical values in the main scan direction are different from numerical values in the sub scan direction (see (C) of FIG. 10).

In this case, in the first embodiment, it is preferable to set both of the window 110D for the DADF and the window 110P for the platen such that numerical values in the main scan direction are different from numerical values in the sub scan direction.

Also, the numerical values shown in FIG. 10 are illustrative, and do not limit the numerical values of the filter coefficients.

Also, the filter process may be changed, for example, by changing the sizes of filters. In this case, a filter positioned on the side where there are the senor and the document may be increased in size, or a filter positioned on the side far wary from the focal length of the sensor may be increased in size.

Second Embodiment

In the second embodiment, the same reference numerals and signs will be used in the drawings in order to designate some elements when they are the same as or similar to those of the first embodiment.

Figure 11:
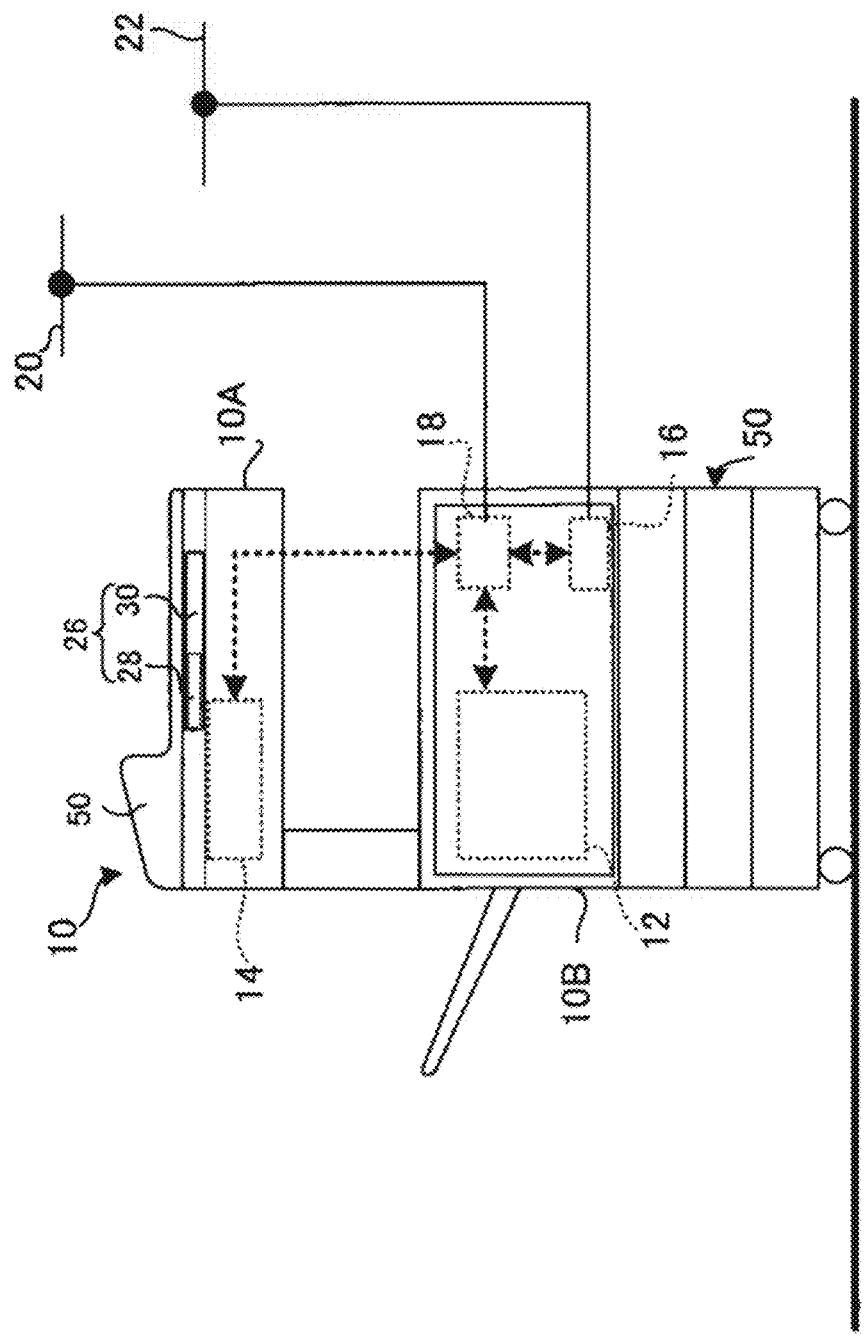
FIG. 11 is a view schematically illustrating an image processing apparatus according to an embodiment.

FIG. 11 shows an image reading apparatus 10 according to a second embodiment.

The image reading apparatus 10 includes an image forming unit 12 for forming images on recording sheets, an image reading unit 14 for reading document images, and a facsimile communication control circuit 16.

The image reading apparatus 10 includes a main controller 18, which controls the image forming unit 12, the image reading unit 14, and the facsimile communication control circuit 16, for example, such that image data obtained by reading document images by the image reading unit 14 is primarily stored, or is transmitted to the image forming unit 12 or the facsimile communication control circuit 16. Also, the image reading unit 14 is covered with an upper casing 10A, and the image forming unit 12, the facsimile communication control circuit 16, and the main controller 18 are covered with a lower casing 10B. At a further lower portion of the lower casing 10B, a plurality of tray units 24 is provided.

Also, on the upper front side of the upper casing 10A covering the image reading unit 14, there is disposed a user interface 26 (hereinafter, also referred to as UI 26) for indicating process operation (service) items including an image reading process, a copying process, an image thrilling process, and a transmitting/receiving process, and indicating detailed settings of each process operation, and displaying the state of the image reading apparatus 10. The UI 26 includes a touch panel unit 28 which displays a display screen with which an operator can bring a finger or the like into contact, thereby issuing an instruction, and a hard key arrangement unit 30 which includes a plurality of hard keys (not shown) on which the operator can perform a mechanical operation (for example, a pushing operation), thereby issuing an instruction.

The main controller 18 is connected to a network communication line network 20 such as the Internet, and the facsimile communication control circuit 16 is connected to a telephone network 22. The main controller 18 has, for example, a function of being connected to a host computer through the network communication line network 20 and receiving image data, or a function of using the telephone network 22 through the facsimile communication control circuit 16 to perform facsimile reception and facsimile transmission.

In the second embodiment, the image forming unit 12, the image reading unit 14, and the facsimile communication control circuit 16 can be used to perform services (processing forms) including scanning, copying, printing, facsimile transmission, facsimile reception, and printing after facsimile reception.

The image forming unit 12 includes photosensitive members, charging units which are provided around the photosensitive members and uniformly charge the photosensitive members, scan exposure units which irradiates the photosensitive members with optical beams on the basis of image data, thereby forming electrostatic latent images, image developing units which develop the electrostatic latent images, transfer units which transfer the developed images on the photosensitive members onto a recording sheet, and cleaning units which clean the surfaces of the photosensitive members after the transferring. Also, the image forming unit 12 includes a fixing unit, which is provided on a recording sheet conveyance path and fixes the image on the recording sheet after the transferring.

Figure 12A:
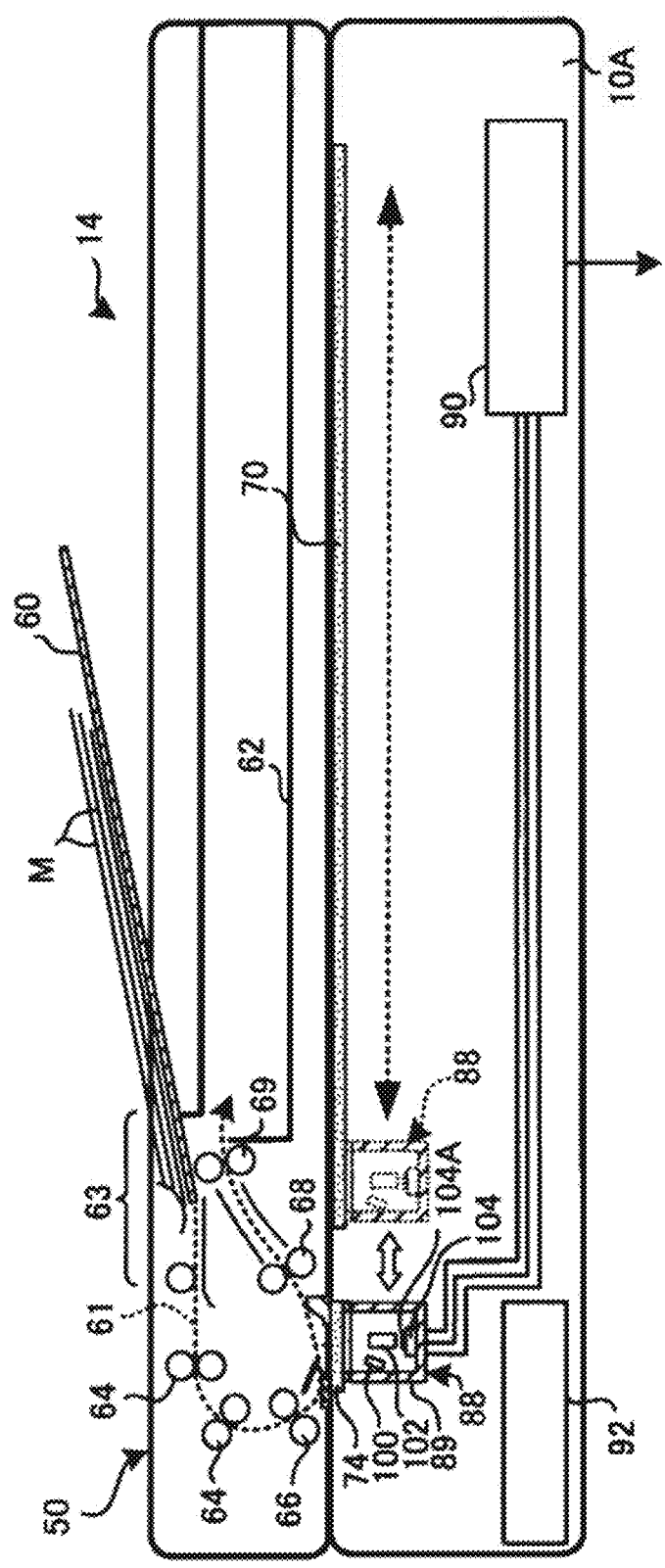
FIG. 12A is a cross-sectional view schematically illustrating an example of the configuration of an image reading unit according to the embodiment.

As shown in FIG. 12A, on the top of the upper casing 10A accommodating the image reading unit 14, an automatic document feeder 50 is provided.

Also, at the upper surface of the upper casing 10A, that is, at a surface facing the automatic document feeder 50, there is provided read glass 70 for mounting a document for image reading.

The automatic document feeder 50 includes a document platen 60 on which documents are mounted, and a discharge platen 62 onto which documents subjected to image reading are discharged.

A document conveyance path 61 from the document platen 60 to the discharge platen 62 has an arc-shaped portion, thereby having a function of reversing documents M.

On the most upstream side of the document conveyance path 61, a sheet sending unit 63 is provided. The sheet sending unit 63 picks up the documents M mounted on the document platen 60. The document conveyance path 61 is formed by a plurality of roller pairs (pairs of sending rollers 64, a pair of aligning rollers 66, a pair of out rollers 68, and a pair of discharging rollers 69). Also, at an appropriate position of the document conveyance path 61, there is provided a guide plate 65 for guiding conveyance of each document M.

The pairs of sending rollers 64 feed the uppermost document of the documents sent from the sheet sending unit 63 to the inside while reversing the corresponding document.

The pair of aligning rollers 66 conveys the document M sent from the upstream side such that the document M passes an area (reading area) facing read glass 74 at a controlled reading timing.

FIG. 12B shows details of the document conveyance path 61 in the reading area.

As shown in FIG. 12B, on the upstream side in a portion of the document conveyance path positioned on the read glass 74, there is disposed a thin elastic film 109 for guiding the document M to the read glass side. Below the elastic film 109, a pad 111 is supported on the top of the left end of the read glass 74. The pad 111 is formed of for example, a material having friction lower than that of the rigid guide plate, so as to guide the document M guided downward by the elastic film 109 to the right side of FIG. 12B. The document M guided by the pad 111 passes over the read glass 74 with a predetermined gap G, and is guided by a jump guide plate 115, and is conveyed by the pair of out rollers 68 positioned on the downstream side.

Below the read glass 74, a CIS unit 88 which is an example of a contact type sensor (to be described below) according to the second embodiment stands by. Therefore, the image of the document M is read by the CIS unit 88.

The pair of out rollers 68 and the pair of discharging rollers 69 discharge the read document M onto the discharge platen 62.

As shown in FIG. 12A, the image reading unit 14 accommodated in the upper casing 10A includes the CIS (contact image sensor) unit 88, a signal processing unit 90 which processes image information signals obtaining by reading images by the CIS unit 88, and a scan control unit 92 which controls scanning of the CIS unit 88.

As shown in FIG. 12B, the CIS unit 88 is accommodated in a casing 89 whose longitudinal direction is set in a direction away from a viewer of FIG. 12B, and is configured to be movable below the read glass 74 and below the read glass 70 along a rail mechanism unit (not shown).

In this case, below the read glass 74, the CIS unit 88 is fixed at a predetermined position (see a solid line position of FIG. 12B) so as to sequentially face the image surface of each document M sent along the document conveyance path 61. That is, the CIS unit 88 performs sub scanning (hereinafter, referred to as DADF sub scanning) on each document M sent from the automatic document feeder 50.

Meanwhile, below the read glass 70, the CIS unit 88 moves forward and backward within a predetermined range. The CIS unit 88 shown by a chain line of FIG. 12B is at a home position in the forward and backward movement.

Here, in a case where a document M is positioned on the upper surface of the read glass 70, one of forward movement and backward movement (a forward path or a backward path) is defined as sub scanning (hereinafter, referred to as platen sub scanning) for reading an image from the corresponding document M.

During DADF sub scanning, the scan control unit 92 performs control, thereby positioning the CIS unit 88 at the predetermined position below the read glass 74. Meanwhile, during the platen sub scanning, the scan control unit 92 performs control, thereby moving the CIS unit 88 forward and backward below the read glass 70, at a predetermined speed.

The CIS unit 88 includes a light source 100, a rod lens array 102, and a sensor substrate 104 having photoelectric conversion elements 104A mounted thereon.

The light source 100 is for illuminating each document M, and includes light emitting elements having the emission wavelengths of colors such as red (R), green (G), and blue (B), and is controlled such that the light emitting elements are sequentially or selectively or simultaneously turned on. Also, light emitted from the light source 100 is radiated onto each document M passing through the reading area positioned on the read glass 70, by a light guide member (not shown) elongated and disposed in the width direction of the corresponding document M (a direction away from a viewer of FIG. 12B).

The rod lens array 102 includes a plurality of erect non-magnification image formation type imaging elements arranged in the same direction as the longitudinal direction of the light guide member, and focuses light reflected from each document M, on the photoelectric conversion elements 104A mounted on the sensor substrate 104.

The photoelectric conversion element 104A are arranged along the longitudinal direction of the rod lens array 102, and light reflected from each document M is focused on the photoelectric conversion elements 104A sequentially from one side to the other side of the longitudinal direction, through the rod lens array 102 (main scanning common to DADF sub scanning and platen sub scanning).

The photoelectric conversion elements 104A covert the reflected light into electric signals. Also, the photoelectric conversion elements 104A convert all reflected light of individual colors of red (R), green (G), and blue (B) into electric signals, whereby main scanning of a color image is performed, and the corresponding electric signals are transmitted to the signal processing unit 90 which also acts as an input unit in the second embodiment.

Meanwhile, in the image reading unit 14, in a case where a document M is sent along the document conveyance path 61 from the automatic document feeder 50, when the document M passes over the read glass 74 (DADF sub scanning), the CIS unit 88 reads an image from the document M (hereinafter, referred to as DADF reading). Also, in a case where a document M is positioned on the read glass 70, the CIS unit 88 reads an image from the document M while moving below the read glass 70 (platen sub scanning) (hereinafter, referred to as platen reading). In both of DADF reading and platen reading, main scanning and sub scanning are performed between the CIS unit 88 and the corresponding document M.

More specifically, in DADF reading, the CIS unit 88 is fixed, and then the CIS unit 88 performs main scanning while a document M is conveyed in the sub scan direction. Meanwhile, in platen reading, a document M is fixed, and then the CIS unit 88 performs main scanning while moving in the sub scan direction.

In this case, due to the structure of the CIS unit 88, for example, device differences including a relative position difference between the photoelectric conversion elements 104A and the rod lens array 102, and the read mode (DADF reading or platen reading) results in a difference in the resolution of the main scan direction (to be described below) greater than a difference in the resolution of the sub scan direction.

The resolution differences may be remarkably shown as differences in blurring and smear of thin lines Lsm which are included in an image read by main scanning and extend in the main scan direction and thin lines Lss which are included in an image read by main scanning and extend in the sub scan direction (see FIG. 17).

In this case, it can be considered to perform a normal filter process, thereby correcting the degree of sharpness. Here, in general, the target of the filter process is a frequency band analyzed on the basis of the density of the read image. That is, in a case where the density varies gently, the target of the filter process is a relatively low frequency, and in a case where the density varies suddenly, the target of the filter process is a relatively high frequency. The filter process is a process of adjusting density variation in a specific frequency band, or the like. For example, with respect to the density of a target pixel, a correction magnification (filter coefficient) is set on the basis of the peripheral pixels (to be described below with reference to FIGS. 14A to 14D).

However, if a filter for enhancing sharpness (a high-pass filter shown in (C) of FIG. 20) is applied over the entire image, blurring and smear are resolved, but the image may become rough.

Also, as a reference, if a smoothing filter for moderating sharpness (a low-pass filter shown in (C) of FIG. 20) is applied over the entire image, since roughness is eliminated, the image may get blurred.

For this reason, in the second embodiment, on the basis of a band-pass filter which has the functions of both of a high-pass filter for sharpness and a low-pass filter for image smoothing and enhances sharpness with respect to a specific band, the filter coefficients of the band-pass filter are set such that the filter coefficients of the main scan direction are different from the filter coefficients of the sub scan direction. That is, with respect to a target pixel which is a filter process target, although the filter coefficients of the main scan direction and the filter coefficients of the sub scan direction are generally set to the same filter coefficients, they are separately set.

Figure 13:
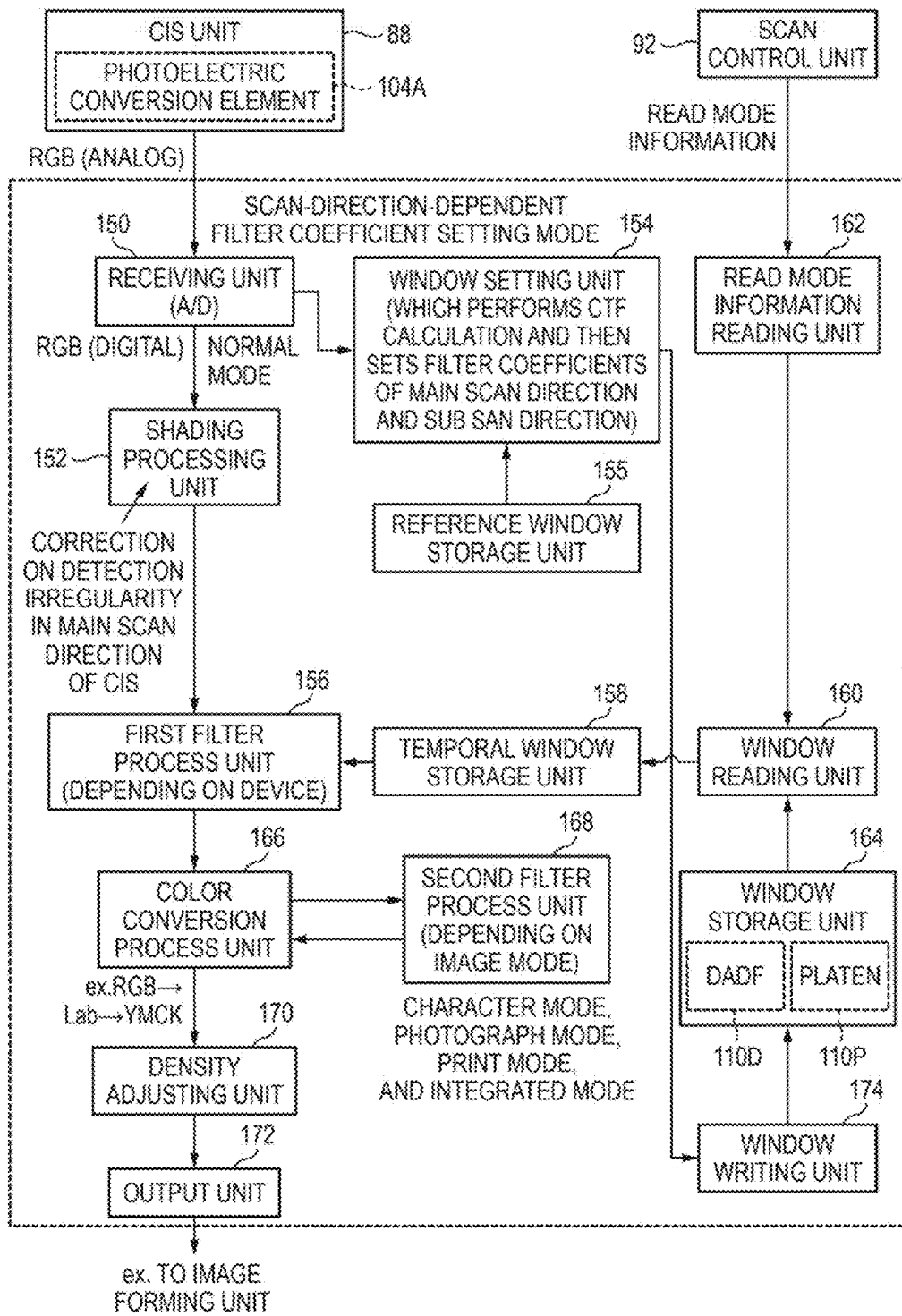
FIG. 13 is a view illustrating functional blocks for image processing control in signal processing of the image reading unit according to the embodiment.

FIG. 13 is a block diagram functionally illustrating the signal processing unit 90 of the image reading unit 14. However, this block diagram does not limit the hardware configuration of the signal processing unit 90.

The photoelectric conversion elements 104A of the CIS unit 88 are connected to a receiving unit 150, and convert light into electric signals (analog electric signals), and transmit the electric signals to the receiving unit 150.

The receiving unit 150 converts at least the received (analog) electric signals of individual colors R, G, and B into digital signals. In a normal mode, the receiving unit 150 transmits the digital signals to a shading processing unit 152.

Meanwhile, in a scan-direction-dependent filter coefficient setting mode, the digital signals (image information) is transmitted to a window setting unit 154. The scan-direction-dependent filter coefficient setting mode will be described below.

In the shading processing unit 152, there has been stored in advance a correction table for correcting variations (detection irregularity) of output signals of the photoelectric conversion elements 104A arranged in the main scan direction in the CIS unit 88. That is, for example, in a case where a document with a constant density in the main scan direction has been read, the shading processing unit 152 corrects differences between outputs such that the outputs become a constant value.

The shading processing unit 152 is connected to a first filter process unit 156. The first filter process unit 156 has a function of correcting degradation in image quality (such as blurring and smear) caused by a difference in resolution between the main scan direction and the sub scan direction. Especially, in thin lines extending in the main scan direction than thin lines extending in the sub scan direction, blurring and smear are remarkably shown.

Degradation in image quality due to a difference in focal position is corrected by an edge enhancement filter process on a specific band by the band-pass filter.

(Principle of Edge Enhancement Filter Process)

FIGS. 14A to 14D are for explaining the principle of the edge enhancement filter process to be a reference.

FIG. 14A shows a reference filter coefficient table 110 (hereinafter, also referred to as reference window 110) which has the total of 25 segments arranged in a 5-by-5 matrix, and whose individual segments corresponds respectively to pixels read by the photoelectric conversion elements 104A. Each pixel to be subjected to the filter process is positioned at the center of the reference window 110 (see reference symbol "A" in FIG. 14A).

Nine reference symbols "A" to "I" are assigned to the individual segments of the reference window 110, and the nine reference symbols become different filter coefficients.

In the reference window 110 of FIG. 14A, the reference symbols are arranged so as to be horizontally and vertically symmetric, whereby pixels of 25 segments can be processed with the nine reference symbols (nine filter coefficients).

FIG. 14B is a chart illustrating the filter coefficients of the individual reference symbols. "Coef (REFERENCE SYMBOL)" is a predetermined numerical value, and is a filter coefficient relative to the corresponding reference symbol of the reference window 110. For example, "Coef A" is a predetermined numerical value, and is a filter coefficient relative to the reference symbol "A" of the reference window 110. Hereinafter, "Coef B" to "Coef I" are filter coefficients relative to the reference symbols "B" to "I".

Also, "FillVal" is a pixel value coefficient which is used when the photoelectric conversion elements 104A are positioned outside the image reading area of a document M. Also, according to setting the numerical values of the filter coefficients, the filter kind (a high-pass filter, a low-pass filter, or a band-pass filter) is determined.

The right view of FIG. 14C shows the correspondence disposition state of the reference window 110 immediately after reading of the document M starts, that is, when scanning (main scanning and sub scanning) is started from the upper left corner of the document M. In this disposition state of the reference window 110, the photoelectric conversion elements 104A reads read information items P as shown in the left view of FIG. 14C. Also, in each two-digit number after the reference symbol "P", the units digit and the tens digit represent the main scan direction and the sub scan direction, respectively, and the read information items P of the total of 25 segments are distinguished by P00 to P04, P10 to P14, P20 to P24, P30 to P34, and P40 to P44.

Here, in a case of performing a filter process on a target pixel (P22 in FIG. 14C), the output of the target pixel P22 is obtained by an arithmetic operation shown in FIG. 14D.

That is, the output of the target pixel P22 is calculated by the following arithmetic expression (1).

$$\begin{aligned}P22 = {}& P00 \times CoefI + P01 \times CoefH + P02 \times CoefF + \\ & P03 \times CoefH + P04 \times CoefI + P10 \times CoefG + P11 \times CoefE + \\ & P12 \times CoefC + P13 \times CoefE + P14 \times CoefG + \\ & P20 \times CoefD + P21 \times CoefB + P22 \times CoefA + P23 \times CoefB + \\ & P24 \times CoefD + P30 \times CoefG + P31 \times CoefE + \\ & P32 \times CoefC + P33 \times CoefE + P34 \times CoefG + P40 \times CoefI + \\ & P41 \times CoefH + P42 \times CoefF + P43 \times CoefH + P44 \times CoefI\end{aligned} \quad (1)$$

Also, in the above example, since segments P00 to P04, P10 to P14, P20, P21, P30, P31, P40, and P41 are positioned outside the image reading area, "FillVal" is applied as their pixel values. Also, as the filter coefficients of them, the same coefficients as those in a case where any section is not positioned outside of the image reading area are used.

Figure 15A:
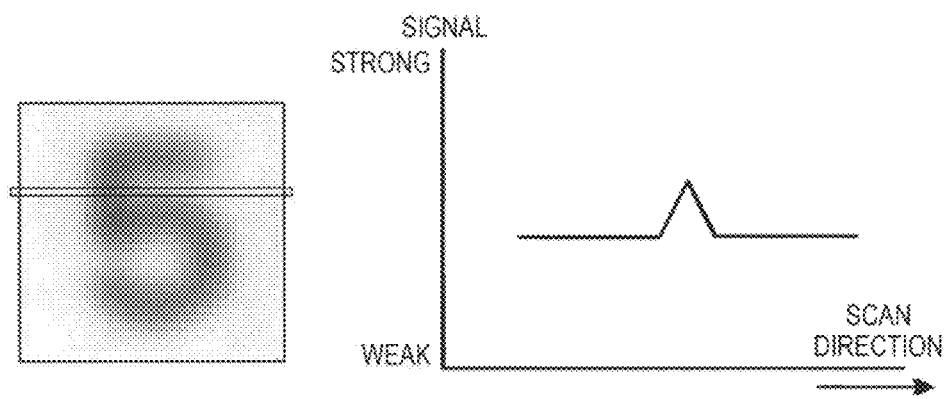
FIG. 15A is a front view illustrating a character image before a filter process, and is a characteristic diagram illustrating the enhancement degree of the character image.
Figure 15B:
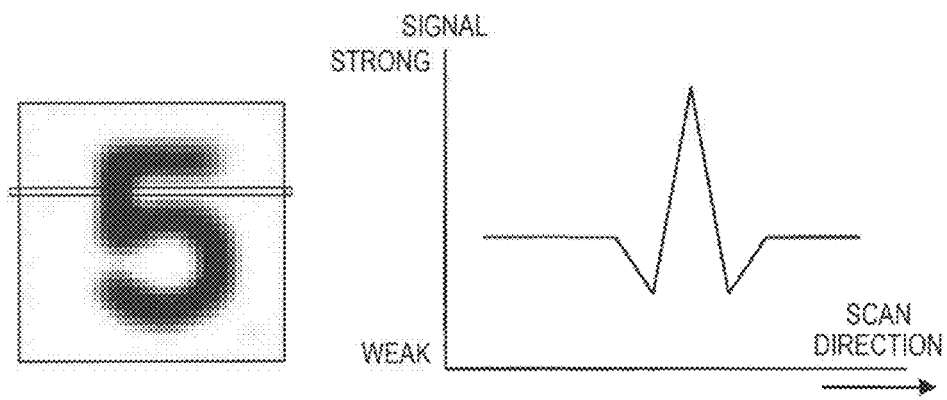
FIG. 15B is a front view illustrating the character image after a filter process, and is a characteristic diagram illustrating the enhancement degree of the character image.

FIGS. 15A and 15B are characteristic diagrams illustrating a relative difference between the density of the target pixel and the density of the peripheral pixels of the target pixel according to an edge enhancement process.

FIG. 15A shows image information received by the receiving unit 150 (see FIG. 13), and FIG. 15B shows image information obtained by an edge enhancement process.

From FIGS. 15A and 15B, it can be seen that the difference in density between the target pixel and the peripheral pixels becomes larger by the edge enhancement process, and thus degradation in image quality such as blurring and smear due to a deviation in the focal length can be corrected by the filter process (the edge enhancement process).

Here, the first filter process unit 156 (see FIG. 13) of the second embodiment corrects degradation in image quality (such as blurring and smear) depending on a difference in resolution between the main scan direction and the sub scan direction, with windows (see (B) of FIG. 20) having filter coefficients set such that the filter coefficients (corresponding to the reference symbols "B" and "D" of FIG. 14A) of the main scan direction in which degradation in image quality is relatively large makes the degree of edge enhancement higher than the filter coefficients (corresponding to the reference symbols "C" and "F" of FIG. 14A) of the main scan direction in which degradation in image quality is relatively small, by use of the principle of the filter process described above.

The windows shown in (B) of FIG. 20 have a window having numerical values of filter coefficients set as a bandpass filter, as a reference window (a window which is stored in the reference window storage unit 155 of FIG. 13). In the reference window (the band-pass filter), with respect to a target pixel, the filter coefficients are set such that the filter coefficients of the main scan direction are different from the filter coefficients of the sub scan direction. Therefore, with respect to a specific band, an edge enhancement process is performed, whereby the degree of edge enhancement in the main scan direction is higher than that in the sub scan direction.

Also, it is preferable to set independent filter coefficient tables (a window 110D for the DADF and a window 110P for the platen) for DADF reading and platen reading, and select and apply the window (the window 110D for the DADF or the window 110P for the platen) according each read mode.

That is, as shown in FIG. 13, the first filter process unit 156 is connected to a temporal window storage unit 158. In the temporal window storage unit 158, there has been stored a window (the window 110D for the DADF or the window 110P for the platen) having filter coefficients corresponding to the read mode (DADF reading or platen reading) and arranged in a matrix.

The temporal window storage unit 158 is connected to a window reading unit 160. The window reading unit 160 is connected to a read mode information reading unit 162 and a window storage unit 164.

Here, the read mode information reading unit 162 reads read mode information (DADF reading or platen reading) from the scan control unit 92, and transmits the read mode information to the window reading unit 160. The window reading unit 160 reads any one of the window 110D for the DADF having filter coefficients for the DADF, and the window 110P for the platen having filter coefficients for the platen, from the window storage unit 164, on the basis of the read mode information, and stores the read window in the temporal window storage unit 158. That is, from that moment, the temporal window storage unit 158 sequentially updates the window (the window 110D for the DADF or the window 110P for the platen), according to the read mode when image reading is performed by the image reading unit 14.

Also, the window 110D for the DADF and the window 110P for the platen are generated by reading the pattern of a resolution measurement document M1 (see FIG. 16), and are stored in the window storage unit 164. The procedure of generating the windows will be described below.

The first filter process unit 156 calculates the density of each pixel on the basis of the above described arithmetic expression (1) by use of the filter coefficients of the window (the window 110D for the DADF or the window 110P for the platen) stored in the temporal window storage unit 158.

The image information subjected to the filter process in the first filter process unit 156 is transmitted to a color conversion process unit 166. The color conversion process unit 166 converts input RGB image information into, for example, CMYK image information for image forming of the image forming unit 12. During this color conversion, for example, color conversion from RGB into CMYK through a Lab color space may be performed (RGB→L*a*b→CMYK). Also, the color conversion is not limited to CMYK, and may be conversion into a designated color space.

The color conversion process unit 166 is connected to a second filter process unit 168. The second filter process unit 168 performs a filter process depending on an image mode. For example, document images are classified into a charter mode, a photograph mode, a print mode, and an integrated mode, and the second filter process unit 168 performs a filter process appropriate for each image. The second filter process unit 168 uses, for example, a non-linear filter, and removes noise and mesh dot components without damaging edge components. More specifically, a non-linear smoothing filter and a non-linear edge enhancement filter are applied. The non-linear smoothing filter removes noise and mesh-dot components while keeping the edge portion. Also, the non-linear edge enhancement filter enhances only the edge portion without enhancing noise.

Also, the color conversion process unit 166 is connected to a density adjusting unit 170. The density adjusting unit 170 corrects uniformly all pixels, for example, with respect to the image information subjected to the filter process or the color converting process, such that the final average density of all pixels becomes a predetermined grayscale value (for example, an intermediate value). However, adjustment of the density adjusting unit 170 is not limited to the above described example.

The image information subjected to the density adjustment of the density adjusting unit 170 is output to, for example, the image forming unit 12, through an output unit 172. Alternatively, the density adjusting unit 170 may transmit the image information to a PC having issued the image reading instruction, a server, or others.

(Generation of Window Having Filter Coefficients Arranged in Matrix)

In the second embodiment, filter coefficients for performing an optimal edge enhancement process in both of the main scan direction and the sub scan direction are set such that with respect to target pixels different in resolution, the filter coefficients of the main scan direction are different from the filter coefficients of the sub scan direction.

Setting of the filter coefficients is performed in the scan-direction-dependent filter coefficient setting mode, unlikely in the above described normal mode. In the filter coefficient setting mode, if the receiving unit 150 receives image information, the receiving unit 150 performs A/D conversion on the image information, and transmits the image information to the window setting unit 154.

Also, in the filter coefficient setting mode, in order to set corresponding filter coefficients, the resolution measurement document M1 (see FIG. 16) is applied.

Figure 16:
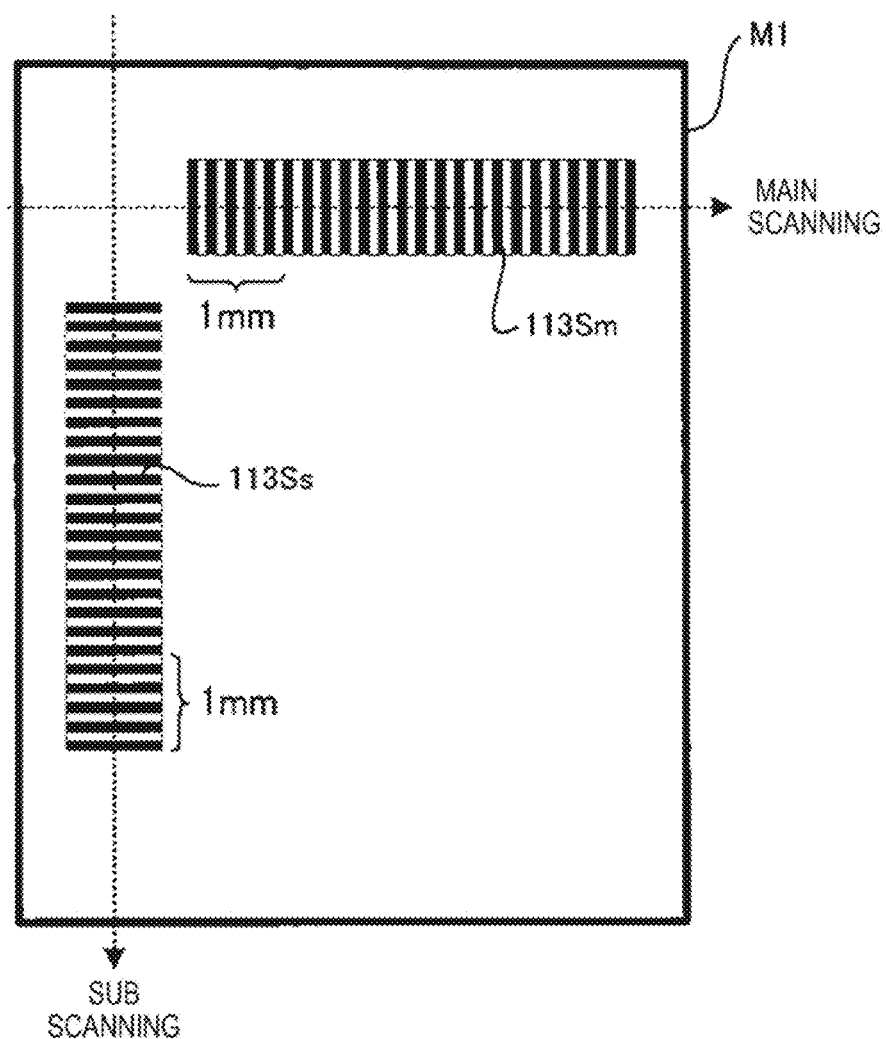
FIG. 16 is a front view illustrating a resolution measurement document.

As shown in FIG. 16, on the resolution measurement document M1, there have been printed a CTF (resolution) measurement pattern 113Sm for analysis in the main scan direction and a CTF (resolution) measurement pattern 113Ss for analysis in the sub scan direction. Each of the CTF measurement patterns 113Sm and 113Ss is a pattern having five pairs of black lines and white lines alternately existing within 1 mm (5 line pairs per mm). The CTF measurement pattern 113Sm is used to measure the resolution of the main scan direction. Meanwhile, the CTF measurement pattern 113Ss is used to measure the resolution of the sub scan direction.

In the scan-direction-dependent filter coefficient setting mode, an image reading process is performed using the resolution measurement document M1, and on the basis of read image information, the window setting unit 154 (see FIG. 13) calculates the resolution by the following arithmetic expression (2).

$$CTF=[(\text{Black Line Density})-(\text{White Line Density})]/\\ [(\text{Black Reference Density})-(\text{White Reference Density})]+100[\%] \quad (2)$$

For example, if the black line density is 160, the white line density is 70, the black reference density is 200, and the white reference density is 50, according to the above arithmetic expression (2), the CTF value becomes 60%.

For example, the CTF value 60% which is the above described calculation result is represents that the CIS unit is in focus, and a CTF value less than 60% represents that blurring and smear according to the numerical value of the CTF value occurs.

As shown in FIG. 13, with reference to the filter coefficients of the reference window 110 (the band-pass filter) taken from a reference window storage unit 155, the window setting unit 154 sets the individual segments of the window (coefficient values corresponding to the reference symbols "A" to "I" shown in FIG. 14A). Also, it is preferable to perform the above described setting separately in DADF reading and in platen reading.

The window 110D for the DADF and the window 110P for the platen having been set are transmitted to the window writing unit 174, and the window writing unit 174 stores the received window 110D for the DADF and the received window 110P for the platen in the window storage unit 164.

Also, the reference window 110 stored in the reference window storage unit 155 has filter coefficients set during design.

Hereinafter, the effects of the second embodiment will be described.

(Filter Coefficient Setting Mode Control Routine)

Filter coefficient setting for setting the windows (the window 110D for the DADF and the window 110P for the platen) having filter coefficients assigned for the DADF and the platen according to the flow chart of FIG. 18 such that the filter coefficients of the main scan direction are different from the filter coefficients of the sub scan direction will be described.

In STEP 1200, the user is instructed to load the resolution measurement document M1 on the automatic document feeder 50. For example, it can be considered to display a message for urging the user to load the resolution measurement document M1, on the UI 26.

Next, in STEP 1202, whether a read start instruction has been received is determined. If the determination result is positive, the routine proceeds to STEP 1204 in which document image read control is performed on the CIS unit 88. Here, the read control is performed such that the CIS unit 88 is fixed below the read glass 74 and reads the conveyed resolution measurement document M1.

Subsequently, in STEP 1206, image information (the CTF measurement pattern 113Sm (main scanning) and the CTF measurement pattern 113Ss (sub scanning) shown in FIG. 16) read from the document M1 is received. Next, in STEP 1208, an initial process including A/D conversion is performed on the image information, and the image information (which is digital information) is transmitted to the window setting unit 154.

Next, in STEP 1210, the image information is analyzed, and on each of the basis of the CTF measurement pattern 113Sm and the CTF measurement pattern 113Ss, the CTF value are calculated by the arithmetic expression (2). Subsequently, in STEP 1212, the filter coefficients of the main scan direction are set. Next, in STEP 1213 the filter coefficients of the sub scan direction are set.

Next, in STEP 1214, the reference window 110 is corrected on the basis of the set filter coefficients, whereby the window 110D for the DADF is generated. Subsequently, in STEP 1216, the window 110D is stored in the window storage unit 164. Then, generation of the window 110D for the DADF finishes. Subsequently, generation of the window 110P for the platen is performed.

In STEP 1218, the user is instructed to load the resolution measurement document M1 on the read glass 70. For example, it can be considered to display a message for urging the user to load the resolution measurement document M1, on the UI 26.

Next, in STEP 1220, whether a read start instruction has been received is determined. If the determination result is positive, the routine proceeds to STEP 1222 in which document image read control is performed on the CIS unit 88. Here, the read control is performed, such that the CIS unit 88 moves to the home position below the read glass 70, and reciprocates from the home position, thereby reading the resolution measurement document M1 fixed on top of the read glass 70.

Subsequently, in STEP 1224, read image information (the CTF measurement pattern 113Sm (main scanning) and the CTF measurement pattern 113Ss (sub scanning) shown in FIG. 16) is received. Next, in STEP 1226, an initial process including A/D conversion is performed on the image information, and the image information which is digital information) is transmitted to the window setting unit 154.

Next, in STEP 1228, the image information is analyzed, and on the basis of each of the CTF measurement pattern 113Sm and the CTF measurement pattern 113Ss, the CTF value is calculated by the arithmetic expression (2). Subsequently, in STEP 1230, the filter coefficients of the main scan direction are set. Next, in STEP 1231, the filter coefficients of the sub scan direction are set.

Next, in STEP 1232, the reference window 110 is corrected on the basis of the set filter coefficients, whereby the window 110P for the platen is generated. Subsequently, in STEP 1234, the window 110P is stored in the window storage unit 164. Then, generation of the window 110D for the DADF finishes, and the routine finishes.

In FIG. 18, generation of the window 110D for the DADF and generation of the window 110P for the platen are sequentially performed. However, the generation order may be reversed. Also, DADF reading and platen reading of the document M1 may be performed in advance, and the generation of the window 110D for the DADF and generation of the window 110P for the platen may be performed in parallel by time division. Also, the generation of the window 110D for the DADF and generation of the window 110P for the platen may be performed independently from each other by separate flow charts.

Also, if the filter coefficients set in the main scan direction and the sub scan direction in DADF reading and the filter coefficients set in the main scan direction and the sub scan direction in platen reading are the same (or they are within a predetermined allowable range, a single window usable for both of the DADF and the platen may be generated.

(Image Read Control Routine)

FIG. 19 is a flow chart illustrating an image read control routine which is in the normal mode.

The image read control of the normal mode is based on the premise that the filter coefficient setting of the flow chart of FIG. 18 has finished and the window 110D for the DADF and the window 110P for the platen have been stored in the window storage unit 164.

In STEP 250, whether any document M has been loaded is determined. In this determination, for example, by signals of sheet size sensors, it is possible to determine whether any document has been loaded on the automatic document feeder 50 or on top of the read glass 70.

In a case where the determination result of STEP 250 is negative, the image read control routine finishes. Meanwhile, in a case where the determination result of STEP 250 is positive, the image read control routine proceeds to STEP 252.

In STEP 252, a read mode is determined. In a case where it is determined that as document M has been loaded on the automatic document feeder 50, in STEP 252, a DADF reading mode is determined. Then, in STEP 254, the window 110D for the DADF is read from the window storage unit 164. Then, the image read control routine proceeds to STEP 258.

Meanwhile, in a case where it is determined that a document M has been loaded on the read glass 70, in STEP 252, a platen reading mode is determined. Then, in STEP 256, the window 110P for the platen is read from the window storage unit 164. Then, the image read control routine proceeds to STEP 258.

In STEP 258, the read window is stored in the temporal window storage unit 158. Then, the image read control routine proceeds to STEP 260. In STEP 260, whether a read start instruction has been received is determined. If the determination result is negative, the image read control routine proceeds to STEP 262 in which whether a stop instruction has been received is determined. If the determination result of STEP 262 is negative, the image read control routine returns to STEP 260, and STEP 260 and STEP 262 are repeated until the determination result of STEP 260 or STEP 262 becomes positive.

If the determination result of STEP 262 becomes positive, document reading is stopped, and the image read control routine finishes. Meanwhile, if the determination result of STEP 260 becomes positive, the image read control routine proceeds to STEP 264 in which document image read control based on the read mode is performed on the CIS unit 88.

In a case of the DADF reading mode, the read control is performed such that the CIS unit 88 is fixed below the read glass 74 and reads the document M conveyed along the document conveyance path 61.

Meanwhile, in a case of the platen reading mode, the read control is performed, such that the CIS unit 88 moves to the home position below the read glass 70, and reciprocates from the home position, thereby reading the document M fixed on top of the read glass 70.

Next, in STEP 266, read image information (analog information) is received. Subsequently, in STEP 268, an initial process including A/D conversion is performed on the image information. Then, in STEP 270, a shading process is performed on the image information.

Next, in STEP 272, the window stored in the temporal window storage unit 158 is read. Subsequently, in STEP 274, a device-dependent filter process is performed. In this case, since the window 110D for the DADF or the window 110P for the platen has been stored on the basis of the read mode in the temporal window storage unit 158, a filter process (edge enhancement process) appropriate for the focal length of the read mode is performed.

Therefore, in every read mode, it is possible to resolve blurring and smear without changes in image quality in the DADF reading mode and the platen reading mode.

Next, in STEP 276, a color converting process is performed. Subsequently, in STEP 278, a filter process depending on the image mode (the charter mode, the photograph mode, the print mode, or the integrated mode) is performed. Then, the image reading control routine proceeds to STEP 280. For example, if a transmission destination is the image forming unit 12, in the color converting process, color conversion from RGB into CMYK through a Lab color space is performed.

In STEP 280, density adjustment is performed. Then, the image reading control routine proceeds to STEP 282 in which the image information is output to, for example, the image forming unit 12.

FIG. 17 shows results obtained by observing the states of blurring and smear in the thin lines Lsm (vertical lines) of the main scan direction read by main scanning, and the thin lines Lss (horizontal lines) of the sub scan direction read by main scanning. Also, the thin lines of the second embodiment depends on the read resolution of the CIS unit 88, and means lines having widths of 1 mm or less.

As shown in FIG. 17, before an edge enhancement process is performed using a window having filter coefficients different between main scanning and sub scanning according to the second embodiment, the thin lines Lsm have blurring and smear, and the thin lines Lss do not have blurring and smear and have sharpness.

From FIG. 17, it can be seen that if the edge enhancement process is performed using the window having the filter coefficients different between main scanning and sub scanning according to the second embodiment, blurring and the smear are eliminated from the thin lines Lsm. Also, it can be seen that the thin lines Lss keep the sharpness even after the edge enhancement process.

Also, although not shown, in a case where the above described thin lines (the vertical lines and the horizontal lines) have been read by sub scanning, if an edge enhancement process based on the filter coefficients of the sub scan direction is performed, blurring and smear are eliminated, and sharpness is maintained. If the filter coefficients of the sub scan direction are the same as the filter coefficients of the main scan direction, a problem in which the sharpness is excessively enhanced may occur. However, if the filter coefficients are set like in the second embodiment such that the filter coefficients of the main scan direction are different from the filter coefficients of the sub scan direction, that problem does not occur.

(Filter Coefficient Adjustment According to Difference in Distance from CIS Unit 88 to Document Between DADF Reading and Platen Reading)

In the second embodiment, with respect to a target pixel, the filter coefficients are set such that the filter coefficients of the main scan direction are different from the filter coefficients of the sub scan direction, whereby a band-pass filter for edge enhancement relative to a specific band is generated.

Meanwhile, as shown in FIG. 12B, in the image reading unit 14, during DADF reading, a distance from a document M to the upper end surface of the CIS unit 88 is L1, and during platen reading, a distance from a document M to the upper end surface of the CIS unit 88 is L2. Between the distance L1 and the distance L2, a difference Δ occurs.

Although the read glass 70 and the read glass 74 are on the same plane, during platen reading, the CIS unit 88 reads an image while a document M is in contact with the read glass 70, whereas during DADF reading, a document M is conveyed over the read glass 74 with the gap G such that the document M is prevented from moving (sliding) while being in contact with the read glass 74. This is one factor for the difference Δ. Also, in a case where there is a difference in level between the upper surfaces of the read glass 70 and the read glass 74, this level difference may be one factor for the difference Δ.

The CIS unit 88 has a shallower focal depth, for example, as compared to as charge-coupled device (CCD). For this reason, in a case where the CIS unit 88 is in focus when the CIS unit 88 is positioned on one side of the read glass (70) side and the read glass (74) side, due to the difference Δ, the CIS unit 88 may be out of focus when the CIS unit 88 is positioned on the other side, whereby a difference in image quality may occur between images read on both sides.

Also, with respect to the focal depth which becomes a reference during design, the CIS unit 88 may be out of focus not only during DADF reading but also during platen reading, due to a deviation in the device including the CIS unit 88, and errors including errors occurring during assembling (hereinafter, generally referred to as device-dependent errors).

For this reason, the resolution may be calculated using the resolution measurement document M1 (see the arithmetic expression (2)), and defocusing may be recognized by estimating the distance on the basis of the correlation between the resolution and the distance, and an edge enhancement process may be applied in response to the amount of defocusing. In this case, degradation in image quality is suppressed. The distance estimation may use a white density pattern.

For example, the window 110D for the DADF shown in (B) of FIG. 20 is obtained by setting specific numerical values (filter coefficients) in the reference window shown in (A) of FIG. 20. Although the specific numerical values (the filter coefficients) of the window 110P for the platen relative to the window 110D for the DADF are not shown in FIG. 20, the numerical values of the window 110P needs only to be set to be uniformly smaller than the filter coefficient values of the window 110D for the DADF. To this end, addition, subtraction, multiplication, or division may be used.

Also, in the second embodiment, the filter process is performed such that the degree of influence of peripheral pixels, that is, the degree of edge enhancement differs between the main scan direction (one direction) and the sub scan direction (a direction intersecting with the one direction), whereby correction for enhancing sharpness is performed. However, the filter process is not limited to the filter process in the narrow sense, and may be any other means capable of performing pixel correction by making the degree of influence differ between peripheral pixels of the one direction and peripheral pixels of the direction intersecting with the one direction (the filter process in the broad sense).

What is claimed is:

1. A correction control device comprising:
a correcting unit that performs edge enhancement correction on image information of an image described on each of documents having been read while the corresponding document and a sensor unit having a light receiving element have been moved relatively to each other where the edge enhancement correction increases a density difference between a pixel and peripheral pixels thereof with respect to every pixel of the image information; and
a setting unit that sets a filter process for the image information of each of the documents to be applied by the correcting unit, according to the distance between the sensor unit and each of the documents.

2. An image reading apparatus comprising:
a sensor unit that includes a plurality of light receiving elements arranged in one direction;
a first reading unit that positions the sensor unit at a first position, and reads an image recorded on each of documents while moving the corresponding document in a direction intersecting with the one direction;
a second reading unit that positions each of documents, and reads an image while moving the sensor unit in a direction intersecting with the one direction;
a correcting unit that performs edge enhancement correction on image information read by the first reading unit and the second reading unit; and
a setting unit that sets different filter processes to be applied on the image read by the first reading unit and the image read by the second reading unit by the correcting unit, on the basis of the difference between the distance from the sensor unit to the image read position of the first reading unit and the distance from the sensor unit to the image read position of the second reading unit.

3. The image reading apparatus according to claim 2, wherein:
the setting unit includes:
a storage unit that stores the correlation characteristic between resolution and the distance;

a calculating unit that calculates resolution on the basis of a resolution measurement pattern read at each read position; and an estimating unit that estimates the distance from the resolution calculated by the calculating unit, on the basis of the correlation characteristic between resolution and the distance stored in the storage unit.

4. The image reading apparatus according to claim 2, wherein:

the setting unit includes:

a storage unit that stores the correlation characteristic between density and the distance;

a calculating unit that calculates density on the basis of a density pattern read at each read position; and an estimating unit that estimates the distance from the density calculated by the calculating unit, on the basis of the correlation characteristic between density and distance stored in the storage unit.

5. An image reading apparatus comprising:

a contact type sensor that reads images by a first reading unit for reading an image of a still document and a second reading unit for reading a moving document;

a correcting unit that performs edge enhancement correction on image information read by the contact type sensor; and a setting unit that sets different degrees of enhancement in the correcting unit, in reading of the first reading unit and reading of the second reading unit.

6. A correction control device comprising:

an input unit which receives pixels having been read while a document and a sensor unit having light receiving elements arranged in one direction have been relatively moved in a direction intersecting with the one direction; and a correcting unit that corrects the pixels by making the degree of influence differ between peripheral pixels of the one direction and peripheral pixels of the direction intersecting with the one direction, with reference to a target pixel which is a correction target of the pixels.

7. The correction control device according to claim 6, wherein the correction which is performed by the correcting unit is correction for enhancing sharpness with respect to a specific amount of change in image density.

8. The correction control device according to claim 6, wherein the correcting unit performs a filter process to which a band-pass filter for performing edge enhancement with respect to a specific frequency band based on image density has been applied, and the filter coefficients during the filter process are set with reference to the band-pass filter.

9. The correction control device according to claim 6, wherein the one direction is a main scan direction, and the direction intersecting with the one direction is a sub san direction, and the degree of edge enhancement in the main scan direction is set to be higher than the degree of edge enhancement in the sub san direction.

10. The correction control device according to claim 6, wherein the one direction is a main scan direction, and the direction intersecting with the one direction is a sub san direction, and the degree of influence of peripheral pixels of the main scan direction is set to be lower than the degree of influence of peripheral pixels of the sub san direction.

11. An image reading apparatus comprising:

a sensor unit that includes a plurality of light receiving elements arranged in one direction;

a reading unit that reads an image recorded on a document while relatively moving the sensor unit and the document in a direction intersecting with the one direction;

a correcting unit that performs a filter process on pixels of an image information unit read by the reading unit; and a setting unit that sets filter coefficients to be applied by the correcting unit, by making the degree of edge enhancement differ between the one direction based on a target pixel which is a correction target, and the direction intersecting with the one direction.

12. The image reading apparatus according to claim 11, wherein a band-pass filter for performing edge enhancement with respect to a specific frequency band based on image density is applied to the filter process of the correcting unit, and the setting unit sets the filter coefficients with reference to the band-pass filter.

13. The image reading apparatus according to claim 11, wherein the setting unit includes a calculating unit that reads a document having a resolution measurement pattern recorded thereon, calculates resolution of the one direction and resolution of the direction intersecting with the one direction, on the basis of the read image information, and wherein the setting unit sets filter coefficients of the one direction, on the basis of the resolution of the one direction calculated by the calculating unit, and sets filter coefficients of the direction intersecting with the one direction, on the basis of the resolution of the direction intersecting with the one direction calculated by the calculating unit.

14. The image reading apparatus according to claim 11, wherein the one direction is a main scan direction, and the direction intersecting with the one direction is a sub san direction, and the degree of edge enhancement in the main scan direction is set to be higher than the degree of edge enhancement in the sub san direction.

15. The image reading apparatus according to claim 5, wherein a correcting unit performs the edge enhancement correction on the image information of the image which is read by the contact type sensor and described on the document, and the edge enhancement correction increases a density difference between a pixel and peripheral pixels thereof with respect to every pixel of the image information.

* * * * *